(12) United States Patent
Shishido et al.

(10) Patent No.: US 12,066,409 B2
(45) Date of Patent: Aug. 20, 2024

(54) TESTING DEVICE

(71) Applicant: SEMICONDUCTOR ENERGY LABORATORY CO., LTD., Atsugi (JP)

(72) Inventors: Hideaki Shishido, Kanagawa (JP); Takayuki Ikeda, Kanagawa (JP)

(73) Assignee: Semiconductor Energy Laboratory Co., Ltd., Atsugi (JP)

(*) Notice: Subject to any disclaimer, the term of this patent is extended or adjusted under 35 U.S.C. 154(b) by 557 days.

(21) Appl. No.: 17/280,327

(22) PCT Filed: Oct. 1, 2019

(86) PCT No.: PCT/IB2019/058320
§ 371 (c)(1),
(2) Date: Mar. 26, 2021

(87) PCT Pub. No.: WO2020/075001
PCT Pub. Date: Apr. 16, 2020

(65) Prior Publication Data

US 2022/0034851 A1    Feb. 3, 2022

(30) Foreign Application Priority Data

Oct. 11, 2018 (JP) ................................. 2018-192526

(51) Int. Cl.
*G01N 29/44* (2006.01)
*G01N 29/04* (2006.01)
(Continued)

(52) U.S. Cl.
CPC ......... *G01N 29/4472* (2013.01); *G01N 29/04* (2013.01); *G01N 29/24* (2013.01);
(Continued)

(58) Field of Classification Search
None
See application file for complete search history.

(56) References Cited

U.S. PATENT DOCUMENTS 6,128,092 A * 10/2000 Levesque ............ G01S 15/8997
356/451
8,519,990 B2    8/2013 Yamazaki et al.
(Continued)

FOREIGN PATENT DOCUMENTS

CN    102844873 A    12/2012
CN    104717927 A    6/2015
(Continued)

OTHER PUBLICATIONS

International Search Report (Application No. PCT/IB2019/058320) Dated Dec. 24, 2019.
(Continued)

*Primary Examiner* — Giovanni Astacio-Oquendo
*Assistant Examiner* — Carl F. R. Tchatchouang
(74) *Attorney, Agent, or Firm* — Fish & Richardson P.C.

(57) ABSTRACT

A cost of a testing device is reduced. A structure of a testing device is simplified. A testing device capable of testing with higher accuracy is provided. A testing device (10) has a structure including a sending unit (13), a receiving unit (14), a control unit (11), and a display (15). The control unit includes a memory portion (21) and an arithmetic portion (22). The sending unit has a function of generating a pulse signal for a probe (40) to generate an ultrasonic wave (51). The receiving unit has a function of generating a first signal including a first analog data (D1) on the basis of the input single input from the probe. The memory portion has a function of storing the first analog data. The arithmetic portion has a function of generating an image signal (S0) output to the display on the basis of the first analog data (Continued)

stored in the memory portion. The display has a function of displaying an image based on the image signal.

18 Claims, 13 Drawing Sheets

(51) Int. Cl.
    *G01N 29/24*     (2006.01)
    *G01N 29/36*     (2006.01)

(52) U.S. Cl.
    CPC ......... *G01N 29/36* (2013.01); *G01N 29/4427* (2013.01); *G01N 2291/0231* (2013.01)

(56) References Cited

U.S. PATENT DOCUMENTS

| | | | |
|---|---|---|---|
| 10,002,656 B2 | 6/2018 | Ikeda et al. | |
| 10,613,206 B2 | 4/2020 | Nakagawa et al. | |
| 10,922,605 B2 | 2/2021 | Kurokawa | |
| 10,984,703 B2* | 4/2021 | Iwaki | H04N 13/261 |
| 2009/0255995 A1 | 10/2009 | Shionoiri et al. | |
| 2015/0073729 A1* | 3/2015 | Borigo | G01N 29/11 |
| | | | 702/39 |
| 2015/0196280 A1 | 7/2015 | Yamamoto | |
| 2017/0030863 A1* | 2/2017 | Holmes | G01N 29/2468 |
| 2021/0297646 A1 | 9/2021 | Iwaki et al. | |

FOREIGN PATENT DOCUMENTS

| | | |
|---|---|---|
| CN | 106061395 A | 10/2016 |
| EP | 3111849 A | 1/2017 |
| EP | 3606062 A | 2/2020 |
| JP | 53-120874 A | 10/1978 |
| JP | 04-301559 A | 10/1992 |
| JP | 2011-523070 | 8/2011 |
| JP | 2014-079569 A | 5/2014 |
| JP | 2018-152399 A | 9/2018 |
| WO | WO-2006/137573 | 12/2006 |
| WO | WO-2011/122280 | 10/2011 |
| WO | WO-2014/050752 | 4/2014 |
| WO | WO-2018/172881 | 9/2018 |

OTHER PUBLICATIONS

Written Opinion (Application No. PCT/IB2019/058320) Dated Dec. 24, 2019.

* cited by examiner

1471

1472

1473

1474

1475

1476

1477

1478

TESTING DEVICE

CROSS REFERENCE TO RELATED APPLICATIONS

This application is a U.S. National Phase Application under 35 U.S.C. § 371 of International Application PCT/IB2019/058320, filed on Oct. 1, 2019, which is incorporated by reference and claims the benefit of a foreign priority application filed in Japan on Oct. 11, 2018, as Application No. 2018-192526.

TECHNICAL FIELD

One embodiment of the present invention relates to a testing device. One embodiment of the present invention relates to a detection device. One embodiment of the present invention relates to a detection device using ultrasonic waves.

Note that one embodiment of the present invention is not limited to the above technical field. Examples of the technical field of one embodiment of the present invention disclosed in this specification and the like include a semiconductor device, a display device, a light-emitting device, a power storage device, a memory device, an electronic device, a lighting device, an input device, an input/output device, a driving method thereof, and a manufacturing method thereof. A semiconductor device generally means a device that can function by utilizing semiconductor characteristics.

BACKGROUND ART

Ultrasonic flaw detection, which is nondestructive testing using ultrasonic waves, is a method of searching for flaws in vehicles such as cars, trains, and airplanes, and constructions such as buildings, iron bridges, and tunnels. In ultrasonic flaw detection, a terminal for testing called a probe sends an ultrasonic wave into an object under testing; the arriving time of the reflected wave at a flaw portion is different from that of the reflected wave at a non-flaw portion, which is utilized for searching the presence or absence or the position of flaws.

For example, Patent Document 1 teaches an ultrasonic detection method in which the pulse-repetition frequency is changed to enable more accurate testing.

REFERENCE

Patent Document

[Patent Document 1] Japanese Translation of PCT International Application No. 2011-523070

SUMMARY OF THE INVENTION

Problems to be Solved by the Invention

An object of one embodiment of the present invention is to reduce the manufacturing cost of a testing device. Another object is to simplify the structure of a testing device. Another object is to provide a testing device capable of testing with higher accuracy. Another object of one embodiment of the present invention is to provide a testing device having a novel structure.

Note that the description of these objects does not preclude the existence of other objects. One embodiment of the present invention does not have to achieve all these objects. Note that objects other than these can be derived from the description of the specification, the drawings, the claims, and the like.

Means for Solving the Problems

One embodiment of the present invention is a testing device including a sending unit, a receiving unit, a control unit, and a display. The control unit includes a memory portion and an arithmetic portion. The sending unit has a function of outputting a pulse signal for a probe to generate an ultrasonic wave. The receiving unit has a function of generating a first signal including a first analog data on the basis of an input single input from the probe and outputting it to the control unit. The memory portion has a function of storing the first analog data. The arithmetic portion has a function of generating an image signal output to the display on the basis of the first analog data stored in the memory portion. The display has a function of displaying an image based on the image signal.

In the above, the receiving unit comprises an amplifier portion. The amplifier portion has a function of amplifying a potential of the input signal and generating a potential of the first analog data.

In the above, the testing device preferably includes a timing circuit. The timing circuit generates a first timing signal and a second timing signal in response to an instruction from the control unit. The sending unit has a function of outputting the pulse signal on the basis of the first timing signal, and the receiving unit has a function of sampling the signal input from the probe and generating the first signal including the first analog data.

In the above, the testing device preferably includes a first signal selection portion and a plurality of the sending units. The first signal selection portion preferably has a function of selecting, among a plurality of the pulse signals input from the plurality of the sending units, the pulse signal output to the probe.

In the above, the testing device preferably includes a second signal selection portion. The second signal selection portion has a function of selecting, among a plurality of the input signals input from the probe, the input signal input to the receiving unit.

The display preferably includes a plurality of pixels. The image signal output by the control unit preferably includes a second analog data associated with coordinates of the pixels. A potential of the second analog data is preferably equal to a potential of the first analog data.

The display preferably includes a level shift circuit. The level shift circuit preferably has a function of shifting a level of the potential of the second analog data and generating a potential input to the pixel.

In the above, the display has a function of displaying a two-dimensional mapping image on the basis of the second analog data.

In the above, the memory portion may have a structure including a memory cell. The memory cell preferably includes a first transistor comprising an oxide semiconductor.

In the above, the arithmetic portion preferably includes an arithmetic circuit which executes analog arithmetic processing. The arithmetic circuit preferably includes a second transistor comprising an oxide semiconductor.

Effect of the Invention

According to one embodiment of the present invention, the manufacturing cost of a testing device can be reduced.

Alternatively, the structure of a testing device can be simplified. Alternatively, a testing device capable of testing with higher accuracy can be provided. One embodiment of the present invention can provide a testing device having a novel structure.

Note that the description of the effects does not preclude the existence of other effects. Note that one embodiment of the present invention does not need to have all these effects. Note that effects other than these can be derived from the description of the specification, the drawings, the claims, and the like.

MODE FOR CARRYING OUT THE INVENTION

Figure 1:
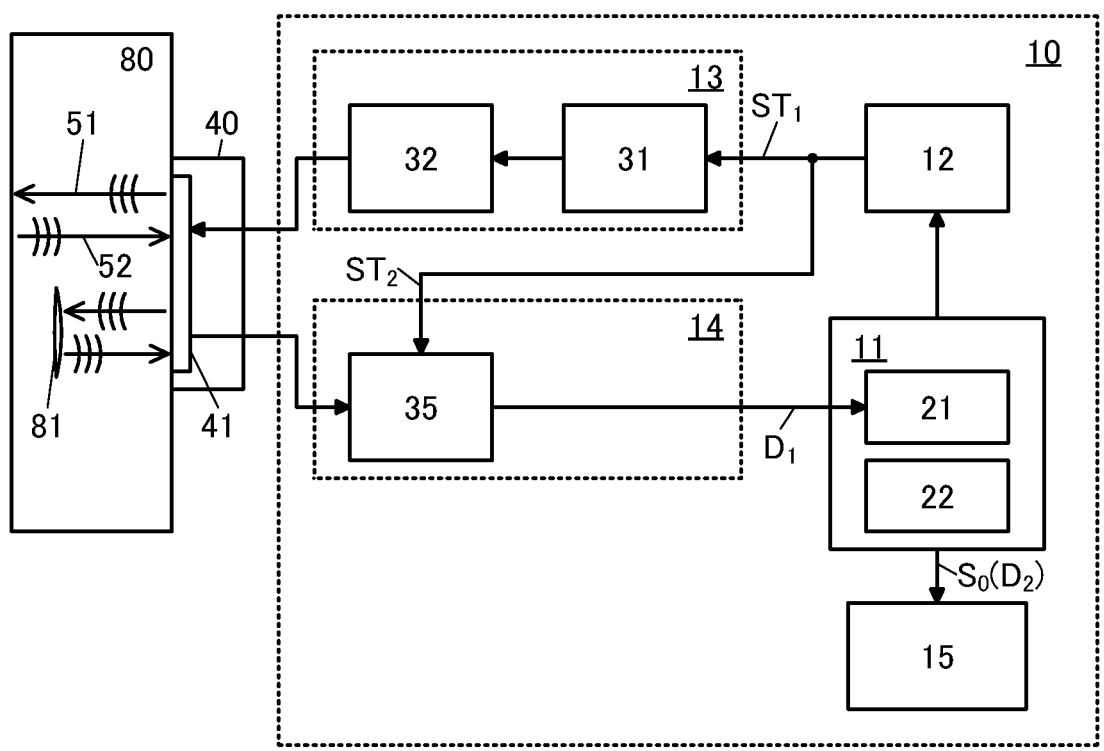
FIG. 1 is a diagram showing a structure example of a testing device.

Hereinafter, embodiments are described with reference to the drawings. Note that the embodiments can be implemented with many different modes, and it will be readily understood by those skilled in the art that modes and details thereof can be changed in various ways without departing from the spirit and scope thereof. Thus, the present invention should not be construed as being limited to the following description of the embodiments.

Note that in structures of the present invention described below, the same portions or portions having similar functions are denoted by the same reference numerals in different drawings, and a description thereof is not repeated. Furthermore, the same hatch pattern is used for the portions having similar functions, and the portions are not especially denoted by reference numerals in some cases.

Note that in each drawing described in this specification, the size, the layer thickness, or the region of each component is exaggerated for clarity in some cases. Therefore, they are not limited to the illustrated scale.

Note that in this specification and the like, the ordinal numbers such as "first" and "second" are used in order to avoid confusion among components and do not limit the number.

Embodiment 1

In this embodiment, a structure example of a testing device of one embodiment of the present invention is described.

One embodiment of the present invention is a testing device which can be used as a nondestructive detection device using ultrasonic waves such as an ultrasonic flaw detection device. According to one embodiment of the present invention, an ultrasonic thickness measurement device, an ultrasonic hardness measurement device, or an ultrasonic sound velocity measurement device can be achieved.

[Structure Example of Testing Device]

FIG. 1 is a block diagram showing a structure example of a testing device 10 of one embodiment of the present invention. FIG. 1 also shows a probe 40, which is connected to the testing device 10, and a specimen 80, which is an object under testing.

The testing device 10 includes a control unit 11, a timing-circuit unit 12, a sending unit 13, a receiving unit 14, and a display 15.

Here, the testing device 10 has a structure including the display 15 as an output means, but the display 15 is not necessarily included. Instead of the display 15, the testing device 10 may include an output means such as an external output terminal or a wireless communication unit for outputting testing data or image signals to an external device described below. The testing device 10 may include both the display 15 and the output means.

The probe 40 capable of being connected to the testing device 10 includes a piezoelectric element 41. The probe 40 can emit an ultrasonic wave 51 from the piezoelectric element 41 on the basis of the pulse signal input from the testing device 10. The piezoelectric element 41 can receive a reflected wave 52 from the specimen 80 and convert it into an electrical signal. The probe 40 can output the electrical signal, as an input signal of the testing device 10, to the testing device 10.

FIG. 1 schematically shows that an ultrasonic wave is generated when the probe 40 is in contact with the specimen 80, the ultrasonic wave 51 travels inside the specimen 80, and the reflected wave 52 from the specimen 80 is input to the probe 40. In a portion with no flaw 81 in the specimen 80, the ultrasonic wave 51 is reflected on the surface of the specimen 80 opposite to the surface where the probe 40 is in contact. In a portion with the flaw 81, on the other hand, the ultrasonic wave 51 is reflected at the flaw 81. The presence or absence of the flaw 81 causes a difference in a period of time from the generation of the ultrasonic wave 51 to the arrival of the reflected wave 52 at the piezoelectric element 41, which is utilized for searching the position or depth of the flaw 81 as well as the presence or absence thereof. Moving the probe 40 across the surface of the specimen 80 may cause the difference in amplitude of the reflected wave 52, which is analyzed to estimate the shape and size of the flaw 81.

The control unit 11 has a function of collectively controlling the components of the testing device 10. The control unit 11 includes at least a memory portion 21 and an arithmetic portion 22.

The timing-circuit unit 12 has a function of outputting a timing signal $ST_1$ and a timing signal $ST_2$ to the sending unit 13 and the receiving unit 14 respectively in response to an instruction from the control unit 11.

The sending unit 13 has a function of generating and outputting a pulse signal output to the probe 40.

FIG. 1 shows a structure in which the sending unit 13 includes a pulse-signal-generation portion 31 and an amplifier portion 32. The pulse-signal-generation portion 31 generates a pulse signal in response to the timing signal $ST_1$ and outputs the pulse signal to the amplifier portion 32. The amplifier portion 32 has a function of amplifying the amplitude of the pulse signal generated in the pulse-signal-generation portion 31 and outputting the amplified pulse signal to the probe 40.

The receiving unit 14 has the following functions: sampling the analog signal input from the probe 40 and generating analog data; setting (or amplifying) the potential of the sampled analog data to an appropriate potential for inputting it to the memory portion 21 of the control unit 11 and generating analog data $D_1$; and outputting the generated analog data $D_1$ to the control unit 11.

FIG. 1 shows a structure in which the receiving unit 14 includes an amplifier portion 35. The amplifier portion 35 samples, in response to the timing signal $ST_2$, an analog signal input from the probe 40, amplifies the potential of the sampled analog data to generate the analog data $D_1$, and outputs it to the control unit 11.

The amplitude, frequency, duty ratio, and pulse shape of the pulse signal output by the sending unit 13 is preferably capable of being set by the user. For example, based on the predetermined setting by the user, the control unit 11 controls the timing-circuit unit 12, whereby a desired pulse signal can be output. The sampling timing of the receiving unit 14 is also preferably capable of being set by the user. For example, based on the predetermined setting by the user, the control unit 11 controls the timing-circuit unit 12, whereby an input analog signal can be sampled at desired timing.

The memory portion 21, which is included in the control unit 11, has a function of storing analog data as an analog value. The control unit 11 can store the analog data $D_1$ input from the receiving unit 14 to the memory portion 21 without converting the analog data to digital data.

In this specification and the like, analog data means data represented by continuous amount (e.g., data potentials). On the other hand, digital data means data represented by discreet amount. Thus, digital data includes data represented by two values and multiple-valued data represented by three or more values.

The memory portion 21 preferably has a structure in which one memory cell can store an analog value. This greatly enlarges data amount per memory cell compared to the memory portion in which a memory cell storing two-valued digital data of 0 or 1 is used, for example. This can make the memory-cell-array area used to the memory portion 21 quite small. This can also make the data-writing speed and data-reading speed of the memory portion 21 fast to the same amount of data, and can reduce power consumption.

Figure 7:
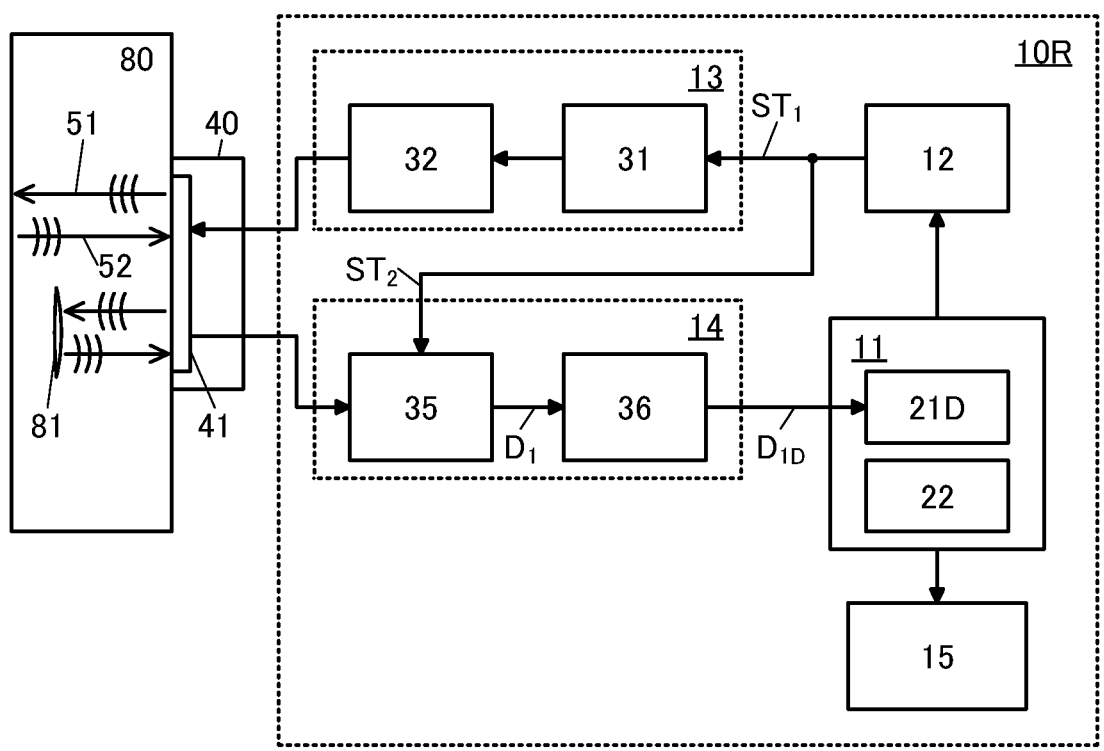
FIG. 7 is a diagram showing a structure example of a testing device.

Instead of the memory portion 21 in FIG. 1, FIG. 7 shows a structure with a memory portion 21D storing digital data, for example.

At this time, the receiving unit 14 needs an A/D converter portion 36 to convert the analog data $D_1$, which is generated by the amplifier portion 35, to digital data $D_{1D}$. This expands the circuit size of the receiving unit 14 and makes the power consumption of the receiving unit 14 high.

In addition, the structure shown in FIG. 7 needs to convert the analog data $D_1$ to the discreet digital data $D_{1D}$, which might lose some data. The larger the number of bits of the digital data $D_{1D}$ is, the more accurate the data becomes; however, this increases the data amount and power consumption, and necessitates a larger circuit size of the A/D converter portion 36. In addition, the larger the number of bits of the digital data $D_{1D}$ is, the larger the size of the memory portion 21D should be, which increases the power consumption of the control unit 11.

The testing device 10 in FIG. 1, on the other hand, can make the circuit size of the receiving unit 14 small and reduce the power consumption compared to the structure in FIG. 7. Furthermore, the circuit size and the power consumption of the control unit 11 may be reduced. This structure can decrease the number of components of the testing device 10, so that the testing device 10 can be manufactured with a smaller cost. This also makes the testing device 10 small and light, which makes it easy to be carried. For the use of flaw detection, it is very important to make devices small and light since targets under detection may be massive structures such as buildings and tunnels.

Particularly for the memory portion 21, a memory circuit (also referred to as analog memory) using transistors including an oxide semiconductor is preferably used. The transistor using an oxide semiconductor can have extremely low leakage current (off-state current) at the off state compared to transistors using silicon, which can reduce power consumption at the stand-by state. A memory cell composed of transistors using an oxide semiconductor can store the analog value input to the memory cell for a long time; thus, an analog memory whose data does not easily change can be manufactured.

The arithmetic portion 22 in the control unit 11 has a function of generating an image signal $S_0$ on the basis of the analog data $D_1$ stored in the memory portion 21. The control unit 11 can output the image signal $S_0$ generated in the arithmetic portion 22 to the display 15. The arithmetic portion 22 may have a structure feasible to perform digital arithmetic processing, and preferably have a structure feasible to perform analog arithmetic processing in particular. This removes the necessity to convert the analog data $D_1$ stored in the memory portion 21 to digital data to be processed and can reduce the circuit size of the control unit 11.

As an image displayed on the display 15, the waveform of the received ultrasonic wave and a two-dimensional mapping image obtained by analyzing the waveform can be given. It is preferable that the user set information that is displayed on the display 15.

Figure 2:
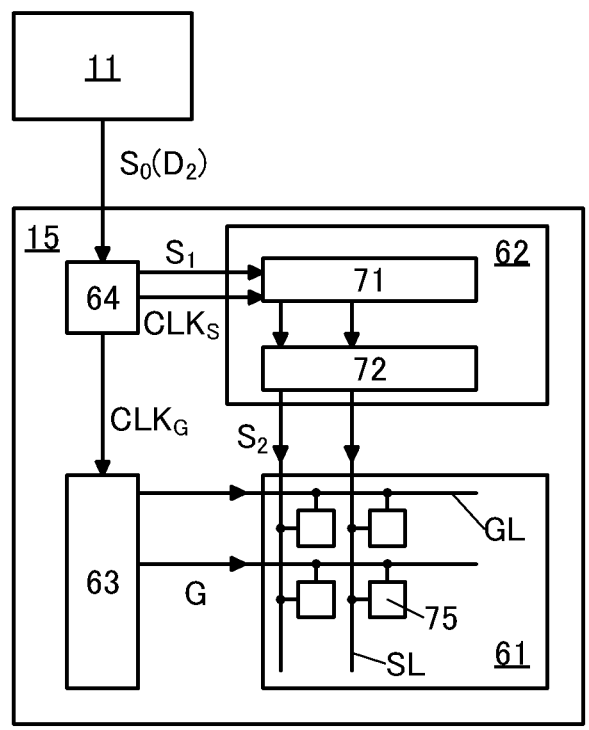
FIG. 2 is a diagram showing a structure example of a testing device.

FIG. 2 is a block diagram showing a structure example of the display 15.

The display 15 includes a pixel portion 61, a source driver circuit 62, a gate driver circuit 63, a timing circuit 64, and the like. The pixel portion 61 includes a plurality of pixels 75 arranged in a matrix. The pixel portion 61 is provided with a plurality of source lines SL, to which the source driver circuit 62 inputs a signal $S_2$ as an image signal (also referred to as video signal), and a plurality of gate lines GL, to which the gate driver circuit 63 inputs a signal G as a selection signal.

The timing circuit 64 has a function of generating signals (e.g., a clock signal $CLK_S$, a clock signal $CLK_G$, and a start-pulse signal), which are output to the source driver circuit 62 or the gate driver circuit 63, on the basis of the synchronization signal in the image signal $S_0$, which is input from the control unit 11. The timing circuit 64 has a function of generating a signal $S_1$, which is output to the source driver circuit 62, from the image signal $S_0$.

The source driver circuit 62 has a function of generating a signal $S_2$, which is output to each source line SL, from the signal $S_1$ and sequentially outputting the signals $S_2$ to each source line SL in response to the timing signal $CLK_S$. The gate driver circuit 63 has a function of sequentially selecting the gate lines GL in response to the timing signal $CLK_G$, and outputting the signal G to the selected gate line GL.

The source driver circuit 62 includes a sequential circuit 71 and a level shift circuit 72 in the example of FIG. 2. The source driver circuit 62 may have a buffer circuit and the like. When the signal $S_1$, which is input from the timing circuit 64, is digital data, the source driver circuit 62 may have a D/A converter circuit.

The sequential circuit 71 includes, for example, a shift register circuit and a latch circuit. The signal $S_1$, which is input to the sequential circuit 71, is sampled according to the timing signal generated by the shift register circuit, and output to the level shift circuit 72.

The level shift circuit 72 has a function of converting the potential of the signal input from the sequential circuit 71 to the potential output to the source line SL. The level shift circuit 72 can enlarge the amplitude of the voltage of the input signal to output it, for example. The level shift circuit 72 enables upstream circuits (e.g., sequential circuit 71 and timing circuit 64) to drive with a low voltage, which facilitates rapid operation.

Here, the image signal $S_0$ input from the control unit 11 preferably includes an analog signal. In other words, the image signal $S_0$ is preferably a signal including the analog data $D_2$ associated with coordinates of the pixels of the pixel portion 61. This removes the necessity of providing a D/A converter circuit in the source driver circuit 62, which can simplify the circuit structure.

The potential of the analog data $D_2$ included in the image signal $S_0$ is preferably equal to the potential of the analog data $D_1$ stored in the memory portion 21. This can communize the driving voltage (or power voltage) of the timing circuit 64 and the sequential circuit 71 of the source driver circuit 62 with the driving voltage of the memory portion 21.

In particular, when a two-dimensional mapping image is included in images displayed on the display 15, the data of the two-dimensional map can be represented by the luminance of each pixel 75. The gray scale (i.e., luminance) of the pixels 75 is configured to be determined by the potential of the analog data $D_2$ included in the image signal $S_0$, whereby the load on the arithmetic processing for generating an image signal of the arithmetic portion 22 included in the control unit 11 can be reduced. The source driver circuit 62 preferably has a structure in which the level shift circuit 72 converts the potential of the analog data $D_2$ input from the sequential circuit 71 and outputs it to the source line SL.

[Modification Example of Testing Device]

The above example shows one piezoelectric element 41 as the probe 40; described below is a structure example of a testing device to which the probe 40 having two or more piezoelectric elements 41 can be connected. Note that overlapping part, which can be referred to, may be omitted below.

Modification Example 1

Figure 3A:
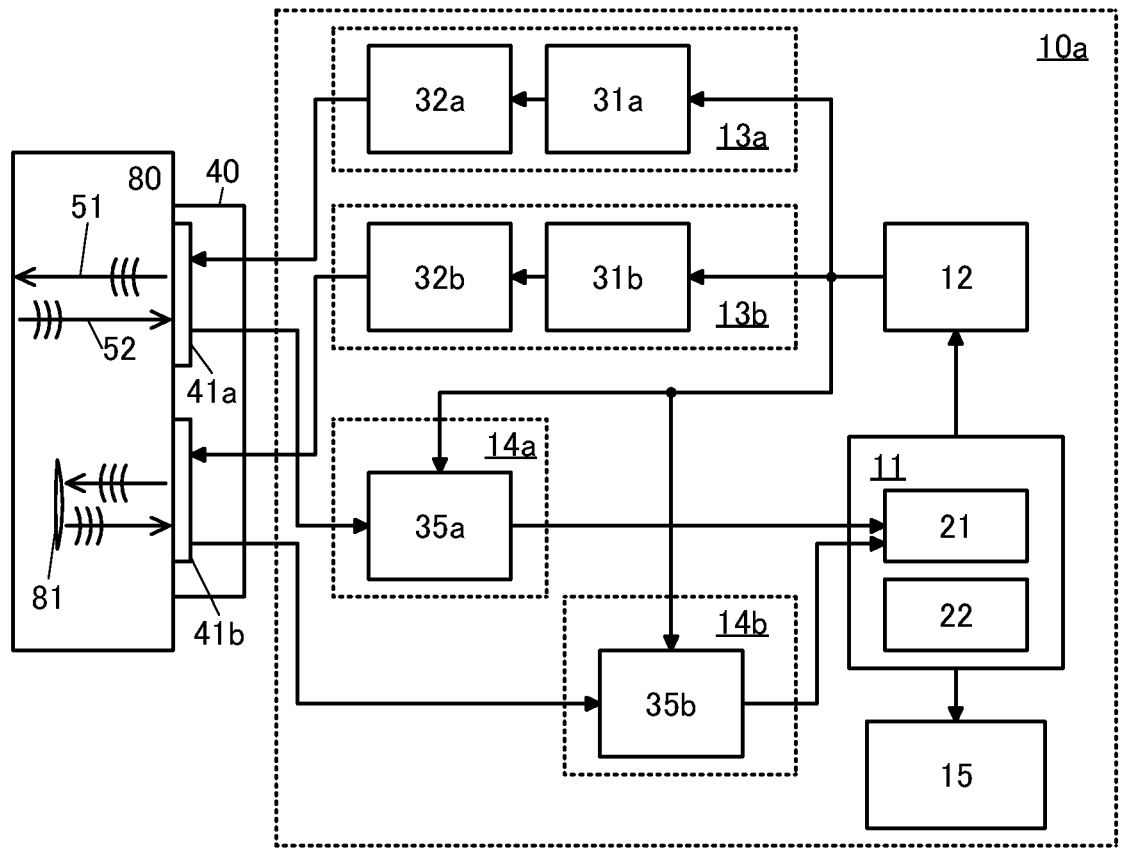
FIG. 3A and FIG. 3B are diagrams showing structure examples of testing devices.

FIG. 3A shows a block diagram of a testing device 10a to which the probe 40 having two piezoelectric elements (a piezoelectric element 41a and a piezoelectric element 41b) is connected.

The testing device 10a is different from the testing device 10 mainly in that the testing device 10a has two sending units (a sending unit 13a and a sending unit 13b) and two receiving units (a receiving unit 14a and a receiving unit 14b). Here the structure has two sending units and two receiving units for ease of description; the structure may have three or more sending units and receiving units depending on the structure of the probe 40.

The sending unit 13a includes a pulse-signal-generation portion 31a and an amplifier portion 32a. The sending unit 13b includes a pulse-signal-generation portion 31b and an amplifier portion 32b. The sending unit 13a has a function of generating a pulse signal output to the piezoelectric element 41a of the probe 40 and outputting it. The sending unit 13b has a function of generating a pulse signal output to the piezoelectric element 41b and outputting it.

The pulse-signal-generation portion 31a and the pulse-signal-generation portion 31b can each generate a pulse signal in response to timing signals (not shown) individually input from the timing-circuit unit 12. Thus, the timing of outputting the pulse signals to the piezoelectric element 41a and the piezoelectric element 41b can be individually set, as well as the amplitude, frequency, duty ratio, and pulse shape of the pulse signals output to them. This enables selection of various testing types to make the testing device 10a more versatile.

The receiving unit 14a includes the amplifier portion 35a. The receiving unit 14b includes the amplifier portion 35b. The receiving unit 14a receives the signal which is received by the piezoelectric element 41a, and amplifies it to output as an analog signal to the control unit 11. The receiving unit 14b receives the signal which is received by the piezoelectric element 41b, and amplifies it to output as an analog signal to the control unit 11.

The receiving unit 14a and the receiving unit 14b can individually receive a signal and output to the control unit 11. Thus, data of the reflected waves 52 received by the piezoelectric element 41a and the piezoelectric element 41b, which are at different locations, can be obtained at the same time. This enables selection of various testing types to make the testing device 10a more accurate.

Modification Example 2

Figure 3B:
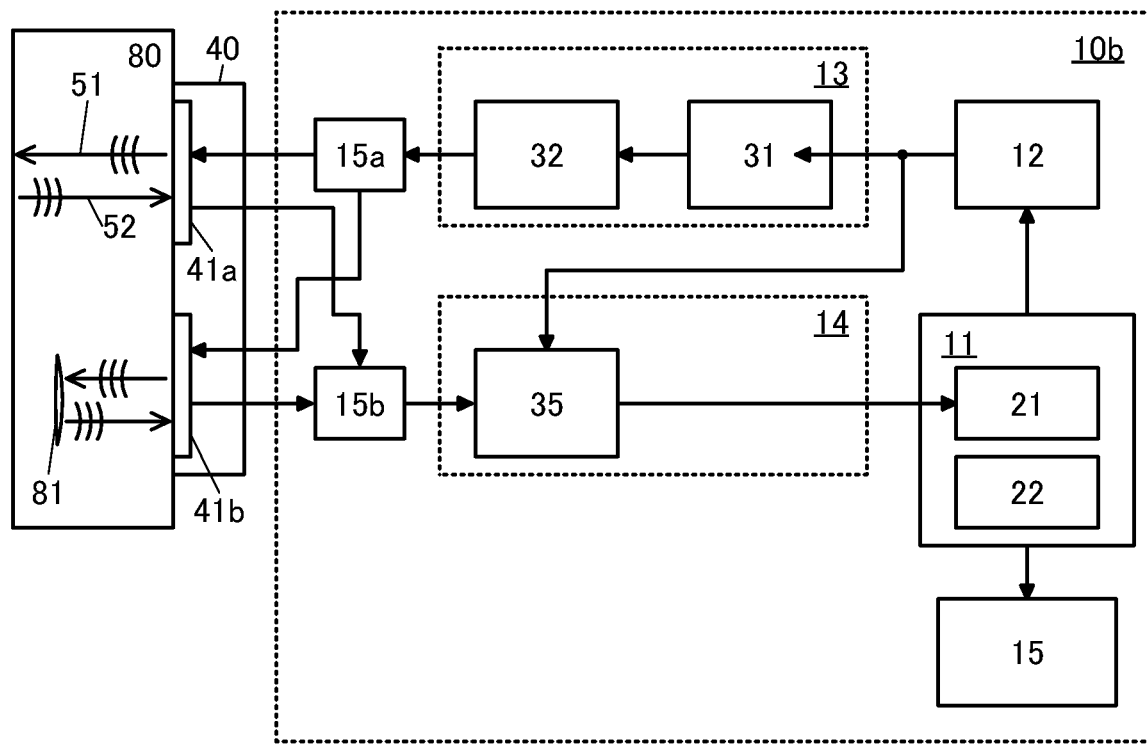

A testing device 10b in FIG. 3B is different from the above testing device 10 mainly in that the testing device 10b includes two selection circuits (a selection circuit 15a and a selection circuit 15b). The selection circuit 15a and the selection circuit 15b each have a function of selecting a signal and outputting it, thereby can be called a signal selection portion.

The selection circuit 15a has a function of selecting whether the pulse signal input from the sending unit 13 is output to the piezoelectric element 41a or the piezoelectric element 41b. The selection circuit 15a enables one sending unit 13 to output a pulse signal to a plurality of piezoelectric elements, which can simplify the structure of the testing device.

The selection circuit 15b has a function of selecting which signal input from each of the piezoelectric element 41a and the piezoelectric element 41b is output to the receiving unit 14. The selection circuit 15b eliminates the necessity to provide a plurality of the receiving units 14, which can simplify the structure of the measurement device.

The testing device 10b in FIG. 3B can preferably use a testing method in which a plurality of piezoelectric elements of the probe 40 sequentially operates to obtain data, for example.

Modification Example 3

Figure 4A:
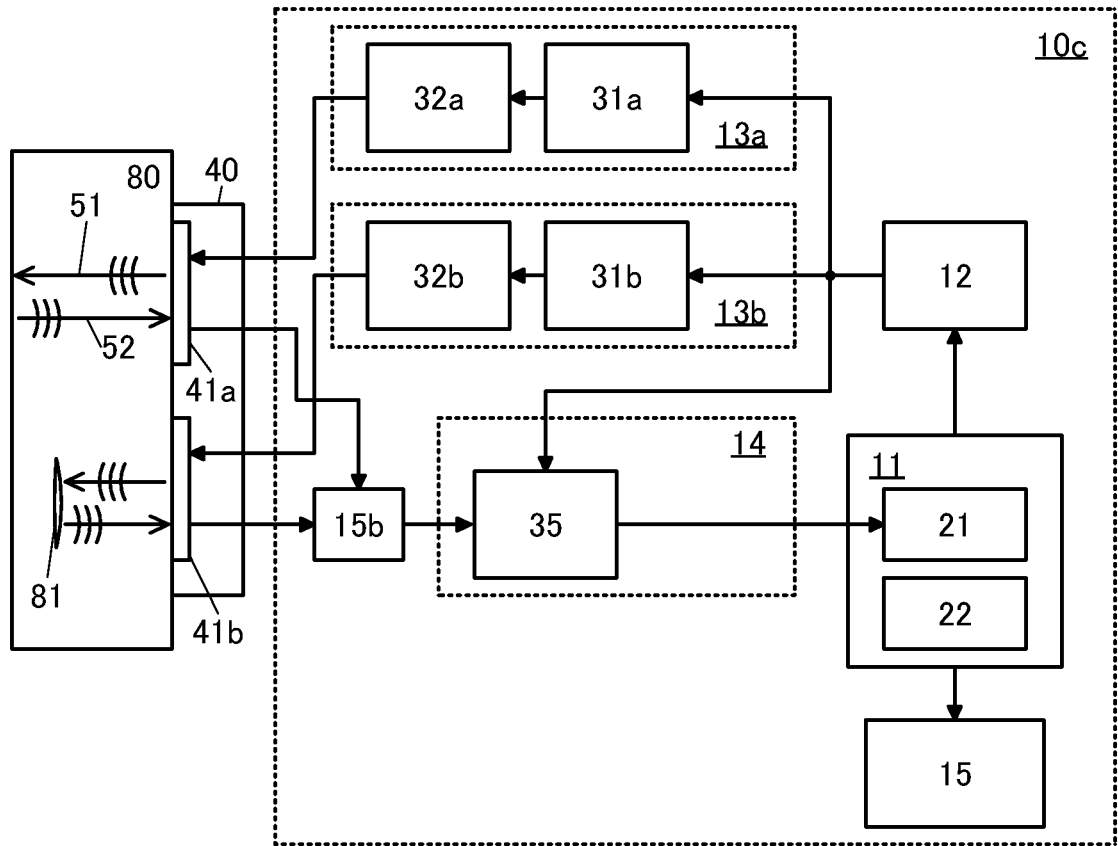
FIG. 4A and FIG. 4B are diagrams showing structure examples of testing devices.

A testing device 10c in FIG. 4A is different from the above testing device 10 mainly in that the testing device 10c includes two sending units (the sending unit 13a and the sending unit 13b) and the selection circuit 15b.

The testing device 10c has a structure in which the piezoelectric element 41a and the piezoelectric element 41b receive pulse signals from different sending units and the signal from one of the piezoelectric elements is output as an analog signal to the control unit 11.

Modification Example 4

Figure 4B:
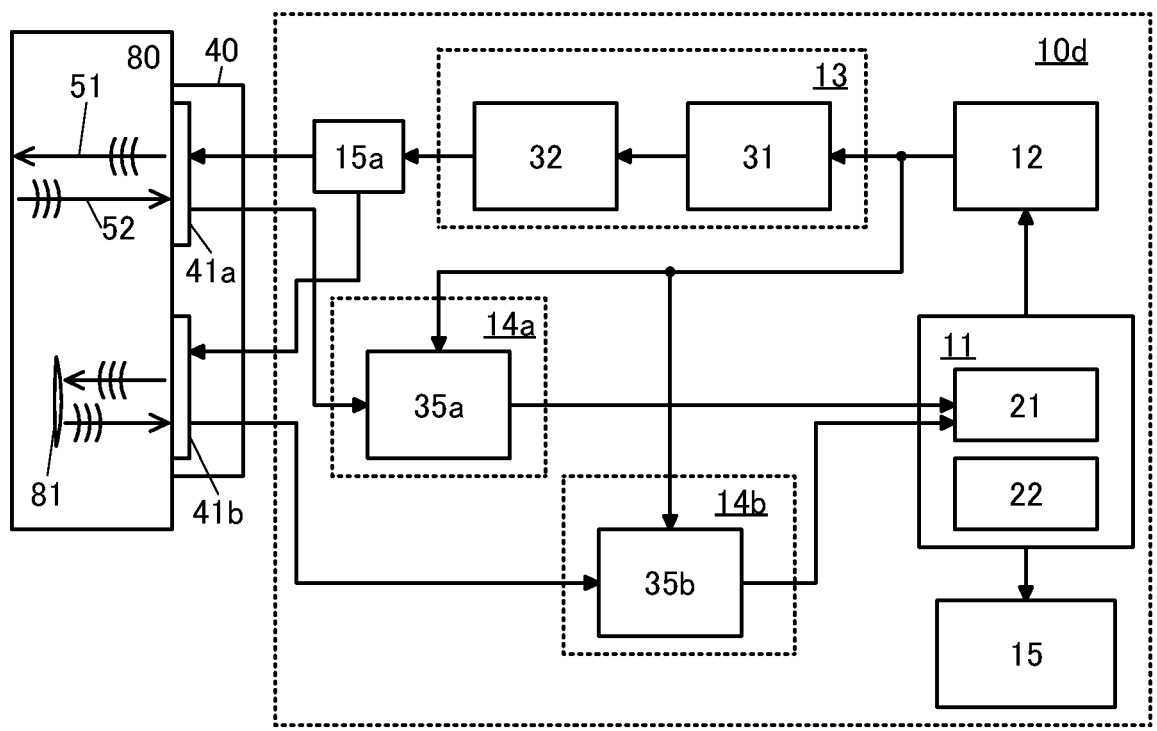

A testing device 10d in FIG. 4B is different from the above testing device 10 mainly in that the testing device 10d includes the selection circuit 15a and two receiving units (the receiving unit 14a and the receiving unit 14b).

The testing device 10d can preferably use a testing method in which the piezoelectric element 41a and the piezoelectric element 41b sequentially generate ultrasonic waves and data from the two piezoelectric elements are obtained at the same time, for example.

In the modification examples herein, one piezoelectric element is used for both sending and receiving; however, one of the two piezoelectric elements may be used for sending and the other may be used for receiving. In addition, a structure may be used in which a plurality of piezoelectric elements for sending and a plurality of piezoelectric elements for receiving are arranged. At this time, the number of the piezoelectric elements for sending and the number of the piezoelectric elements for receiving may be different, and one of them can be one. For example, the structure may be used in which one piezoelectric element for sending and a plurality of piezoelectric elements for receiving are arranged.

Specific Example

Figure 5A:
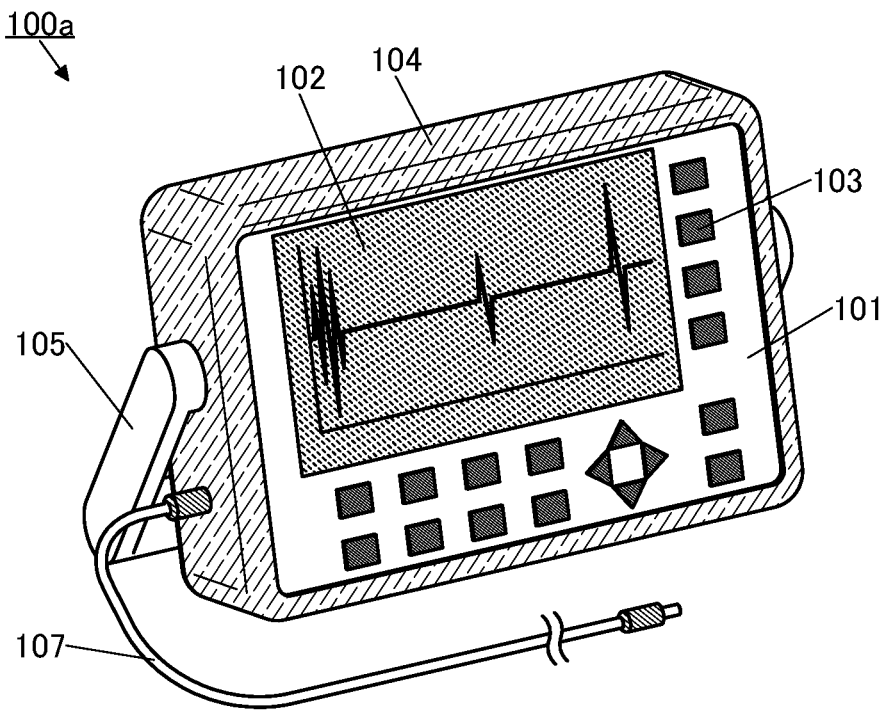
FIG. 5A and FIG. 5B are diagrams showing structure examples of testing devices.

Hereinafter, more specific structure examples of the testing device and probe are described.
[Testing Device]
FIG. 5A is an external view of a testing device 100a. The testing device 100a can be driven by, for example, an internal battery (a secondary battery such as a lithium-ion battery is preferable) and portable. Since the testing device 100a is small and light, ultrasonic-flaw detection can be easily carried out where a large device is difficult to be carried in.

The testing device 100a includes a housing 101, a display 102, operation buttons 103, and the like. A connector cable 107 for connecting to a probe is connected to the testing device 100a.

A protective part 104 to protect the housing 101 of the testing device 100a is attached. As the protective part 104, a high impact-resistant, weather-resistant, and chemical-resistant material such as rubber can be used to endure usages under various environments.

The testing device 100a includes a support member 105. The support member 105 can rotate at the axis of the shaft, and can hold the housing 101 at a desirably tilted state. In addition, when the support member 105 is rotated over the housing 101, the support member 105 can be used as a handle, which facilitates carrying.

FIG. 5A shows an image of a waveform of an ultrasonic wave detected by a probe as an example of an image displayed on the display 102. Here shows three observed waveforms: from left, a waveform of an ultrasonic wave output by a probe, a waveform of a reflected wave (also referred to as echo) from a flaw in a specimen, and a waveform of a reflected wave from the rear side of the specimen; this image shows that there is a flaw in the specimen.

Figure 5B:
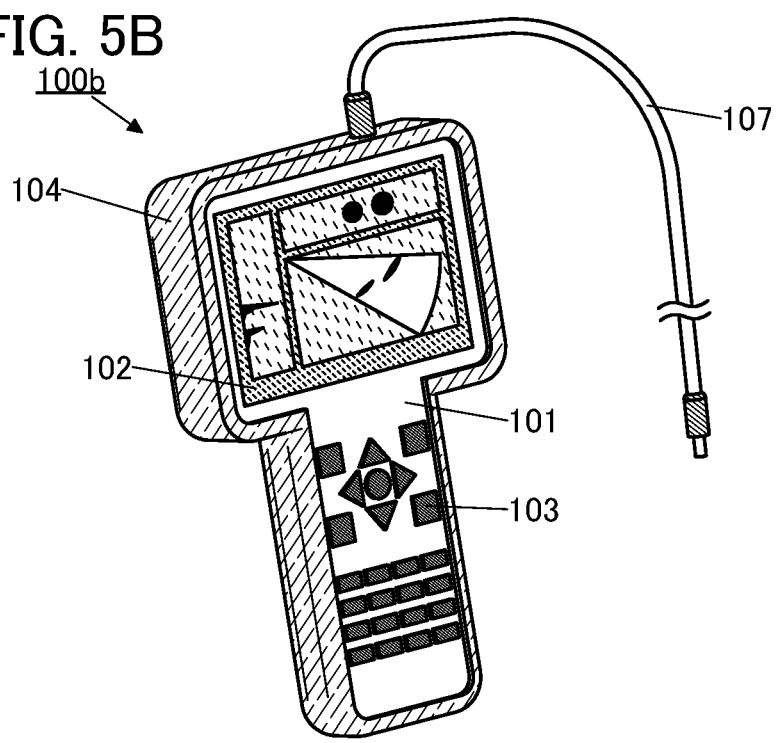

A testing device 100b in FIG. 5B is an example of a handy testing device.

The testing device 100b can be handled and operated by one hand and needs no space to be installed, which expands the range of specimens that can be tested. In addition, the testing device 100b can become so light and small that the load on a user for a long-time detection can be reduced.

In the housing 101 of the testing device 100b, the part where the display 102 is provided is wider than the part where the control buttons 103 and the like are provided, and handled by the user. This is preferable because this enlarges the area of the display 102, which increase information provided to a user, and enables the display 102 to display larger letters and images. The display 102 may also have a function of a touch panel.

FIG. 5B shows a testing result using an angle probe as an example of an image displayed on the display 102. On the left of the display 102, distributions of the intensity of an echo waveform in the depth direction. On the lower right, an image which shows a testing range and the positions and strength of the observed echo waveforms is shown. On the upper right, the positions and strength of the observed echo waveforms are shown as a two-dimensional mapping image which is parallel to the specimen surface.
[Probe]
The probe which can be used for the testing device of one embodiment of the present invention is described.

The probe (also referred to as transducer) includes at least one oscillator (piezoelectric element). An oscillator has a structure in which a dielectric having piezoelectricity is sandwiched between a pair of electrodes.

As the probe, a vertical prove, an angle probe, and the like are given. Alternatively, a water-immersion probe can be used. The vertical probe is an element vertically emitting an ultrasonic wave on the contact surface; this flaw detection method using such a probe is also called vertical flaw detection. On the other hand, the angle probe is an element obliquely emitting an ultrasonic wave on the contact surface; this flaw detection method using such a probe is also called angle flaw detection. The water-immersion probe is an element for testing through the liquid a specimen immersed into a liquid such as water; this flaw detection method using such a probe is also called water-immersion flaw detection.

In a single element probe, which includes one oscillator, the oscillator is for both sending and receiving. In a dual element probe, which includes two oscillators, one can be for sending and the other can be for receiving; the dual element probe can be more preferable for a comparably thin specimen than the single element probe. Alternatively, a probe in which a plurality of oscillators are arranged in a one- or two-dimensional array can be used.

Figure 6A:
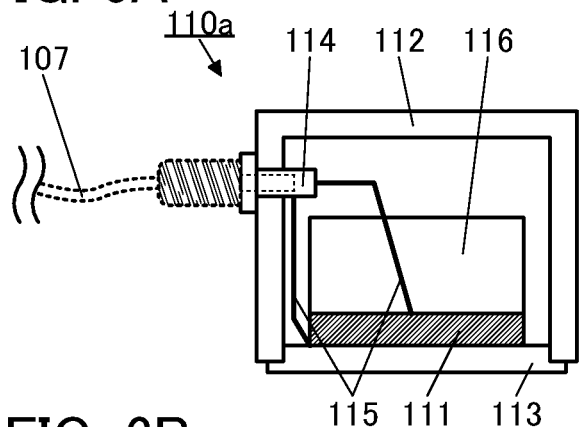
FIG. 6A to FIG. 6C are diagrams showing structure examples of probes.

FIG. 6A shows a structure example of a probe 110a, which can be used as a vertical probe. The probe 110a includes an oscillator 111, a case 112, a contact portion 113, a terminal portion 114, a pair of wirings 115, a damper 116, and the like.

Inside the case 112, the oscillator 111, the damper 116, and the like are provided. On part of the case 112, the terminal portion 114, which is for connecting to a connector cable 107, is provided. FIG. 6A shows the connector cable 107 connected to the terminal portion 114 as dashed lines.

The pair of wirings 115 is connected correspondingly to a pair of electrodes (not illustrated) of the oscillator 111. The pair of wirings 115 is connected to the terminal portion 114.

The contact portion 113 is a portion in contact with the specimen, and can transmit an ultrasonic wave emitted by the oscillator 111 to the specimen.

Figure 6B:
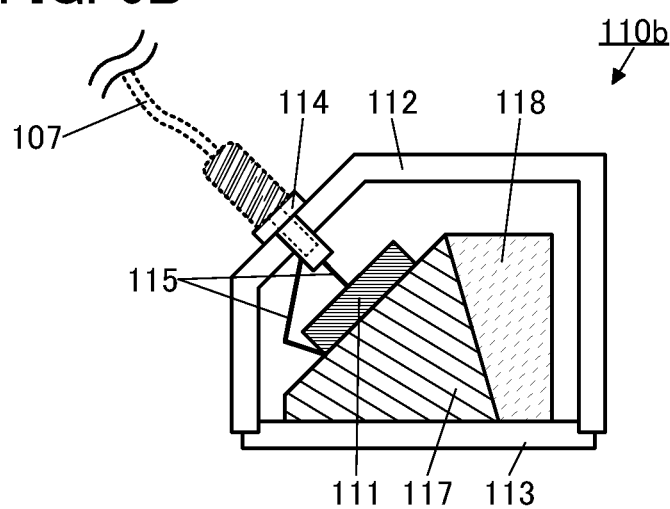

FIG. 6B shows a structure example of a probe 110b functioning as an angle probe. The probe 110b includes a transmitting member 117 and a noise-absorbing member 118.

The transmitting member 117 is provided to be in contact with the oscillator 111 and the contact portion 113. The surface of the transmitting member 117 which is in contact with the oscillator 111 is obliquely cut with regard to the surface of the contact portion 113. This enables oblique emission of an ultrasonic wave to the contact surface of the specimen.

On the surface of the transmitting member 117 which is not in contact with the oscillator 111 and the contact portion 113, the noise-absorbing member 118 is provided. The noise-absorbing member 118 can inhibit the detection of an ultrasonic wave as a noise due to the dispersion of the ultrasonic wave on the surface of the transmitting member 117, and enables more accurate testing.

Figure 6C:
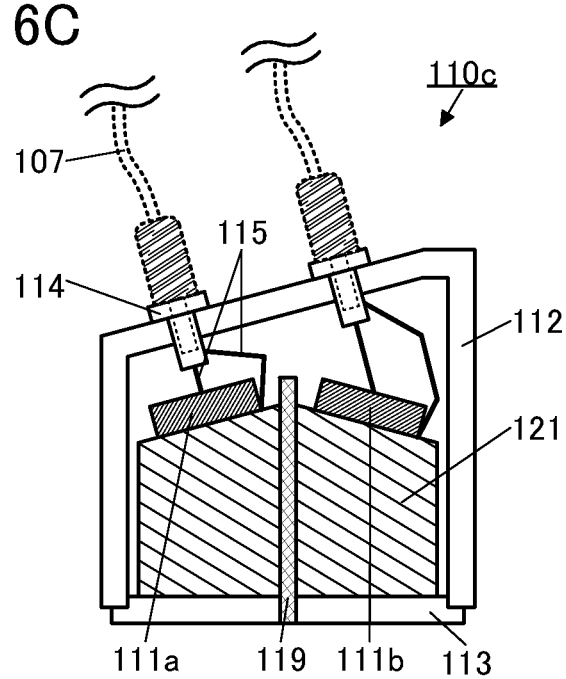

FIG. 6C shows a structure example of a probe 110c functioning as a dual element probe. The probe 110c includes an oscillator 111a for sending, an oscillator 111b for receiving, a sound-separating member 119, a pair of sound-delaying members 121, and the like.

The surface of the pair of sound-delaying members 121 on which the respective oscillator is in contact with is obliquely cut with regard to the surface of the contact portion 113. The oscillator 111a and the oscillator 111b are arranged so that the surfaces in contact with the sound-delaying member 121 face with each other.

By providing the sound-delaying member 121, a predetermined time difference can be provided between the time when the oscillator 111a emits an ultrasonic wave and the time when the oscillator 111b receives an ultrasonic wave. This enables highly accurate testing.

In addition, the sound-separating member 119 is provided between the pair of sound-delaying members 121. The sound-separating member 119 can block the ultrasonic wave emitted by the sending oscillator 111a from directly being transmitted to the oscillator 111b for receiving.

The above is the description of the probe.

At least part of this embodiment can be implemented in combination with the other embodiments described in this specification as appropriate.

Embodiment 2

In this embodiment, a structure example of, in particular, a memory device preferably used for the memory portion of the control unit of the testing device of the present invention is described.

In this embodiment, using FIG. 8 and FIG. 9, a memory device (hereinafter referred to as OS memory in some cases) that uses a transistor using an oxide in a semiconductor (hereinafter referred to as OS transistor in some cases), and a capacitor is described. The OS memory device is a memory device including at least a capacitor and an OS transistor that controls charge and discharge of the capacitor. Since the off-state current of the OS transistor is extremely low, the OS memory device has excellent retention characteristics and can function as a nonvolatile memory.
<Structure Example of Memory Device>

Figure 8A:
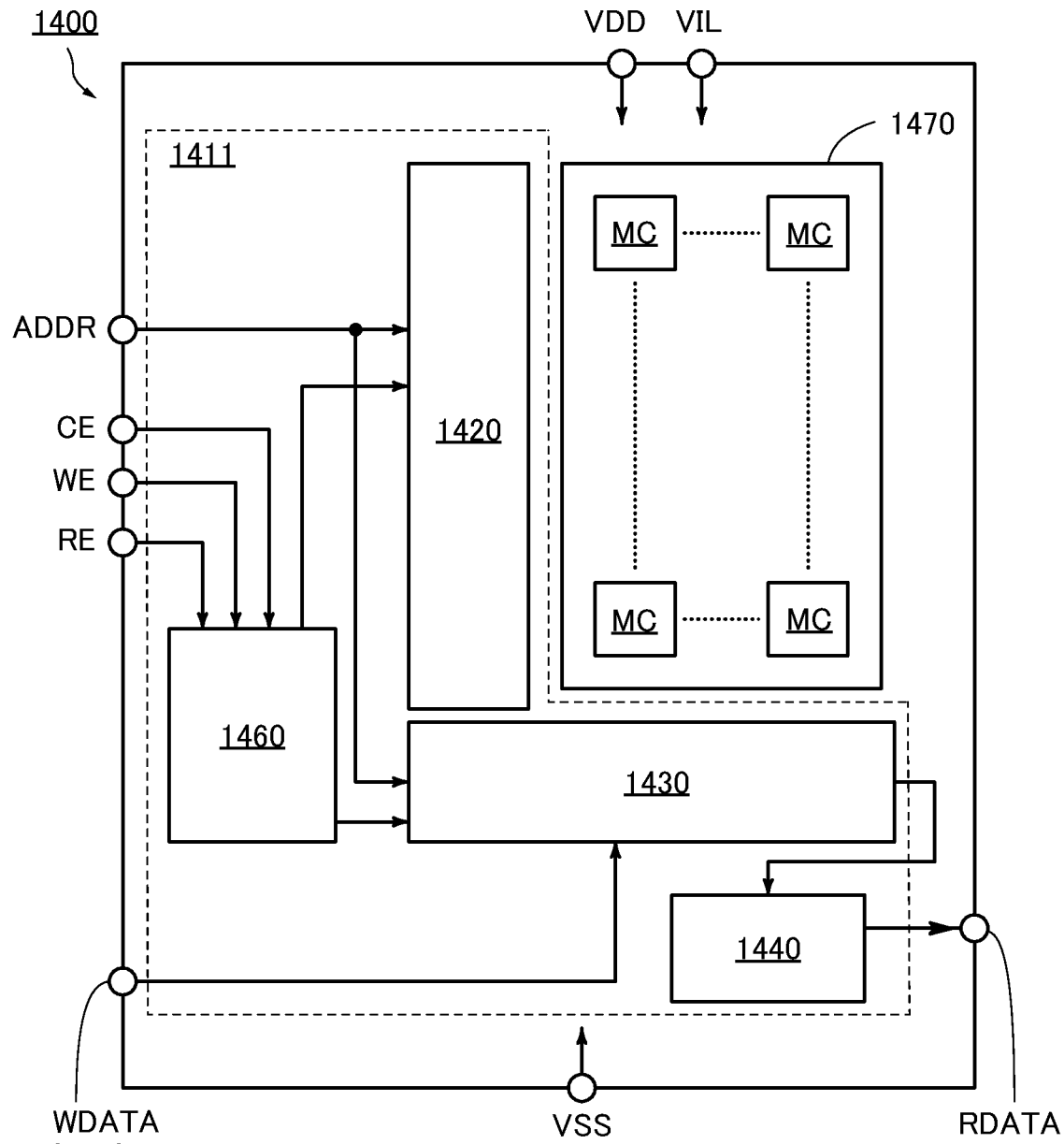
FIG. 8A and FIG. 8B are diagrams showing a structure example of a memory device.

FIG. 8A shows a structure example of an OS memory device. A memory device 1400 includes a peripheral circuit 1411 and a memory cell array 1470. The peripheral circuit 1411 includes a row circuit 1420, a column circuit 1430, an output circuit 1440, and a control logic circuit 1460.

The column circuit 1430 includes a column decoder, a precharge circuit, a sense amplifier, and a write circuit, for example. The precharge circuit has a function of precharging wirings. The sense amplifier has a function of amplifying a data signal read from a memory cell. Note that the wirings are wirings connected to memory cells included in the memory cell array 1470, which is described in detail later. An amplified data signal is output to the outside of the memory device 1400 as a digital data signal RDATA through the output circuit 1440. Furthermore, the row circuit 1420 includes, for example, a row decoder, a word line driver circuit, and the like, and can select a row to be accessed.

As power supply voltages, a low power supply voltage (VSS), a high power supply voltage (VDD) for the peripheral circuit 1411, and a high power supply voltage (VIL) for the memory cell array 1470 are supplied to the memory device 1400 from the outside. In addition, control signals (CE, WE, and RE), an address signal ADDR, and a data signal WDATA are input to the memory device 1400 from the outside. An address signal ADDR is input to the row decoder and the column decoder, and WDATA is input to the write circuit.

The control logic circuit 1460 processes signals (CE, WE, and RE) input from the outside, and generates control signals for the row decoder or the column decoder. CE denotes a chip enable signal, WE denotes a write enable signal, and RE denotes a read enable signal. Signals processed by the control logic circuit 1460 are not limited thereto, and other input signals may be input as necessary.

The memory cell array 1470 includes a plurality of memory cells MC arranged in a matrix and a plurality of wirings. Note that the number of wirings that connect the memory cell array 1470 and the row circuit 1420 depends on the structure of the memory cell MC, the number of memory cells MC included in one column, and the like. Furthermore, the number of wirings that connect the memory cell array 1470 and the column circuit 1430 depends on the structure of the memory cell MC, the number of memory cells MC included in one row, and the like.

Figure 8B:
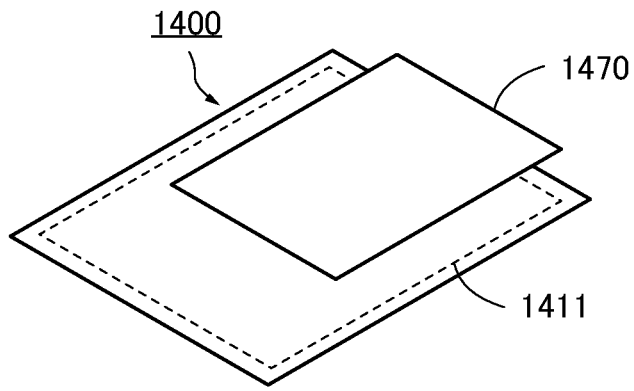

Note that FIG. 8A shows an example in which the peripheral circuit 1411 and the memory cell array 1470 are formed on the same plane; however, this embodiment is not limited thereto. For example, as shown in FIG. 8B, the memory cell array 1470 may be provided over a part of the peripheral circuit 1411 so that they overlap. For example, a structure may be used in which the sense amplifier is provided below the memory cell array 1470 to overlap with the memory cell array 1470.

Structure examples of a memory cell in FIG. 9 that can be used in the memory cell MC are described.
[DOSRAM]

Figure 9A:
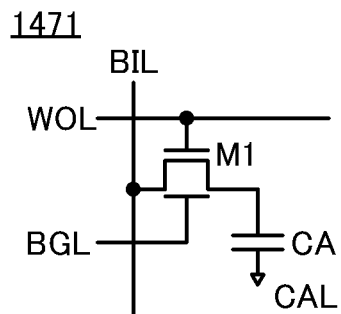
FIG. 9A to FIG. 9H are diagrams showing structure examples of memory devices.
Figure 9B:
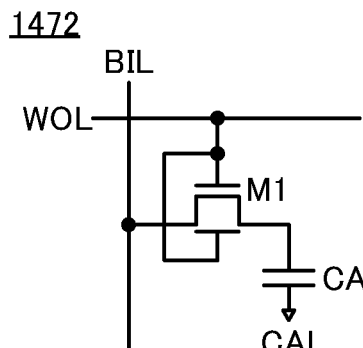
Figure 9C:
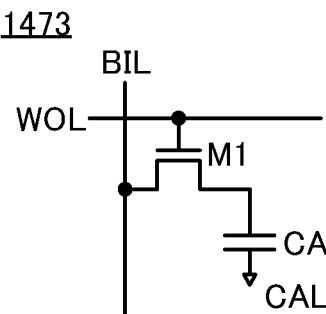
Figure 9D:
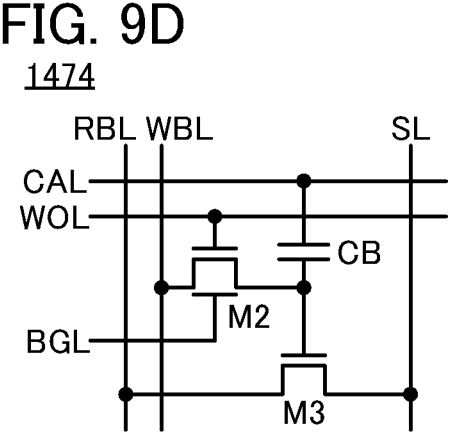
Figure 9E:
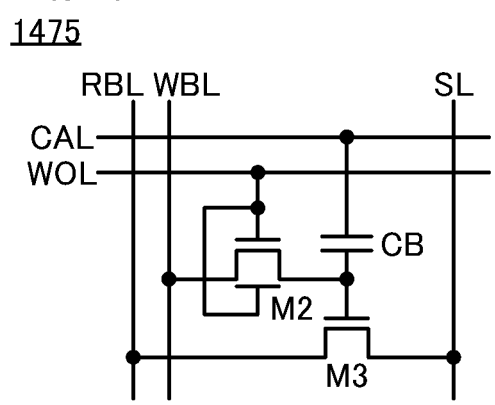
Figure 9F:
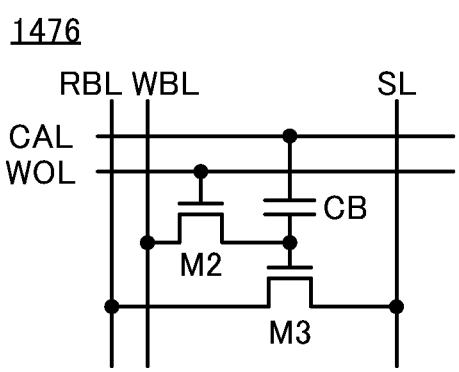
Figure 9G:
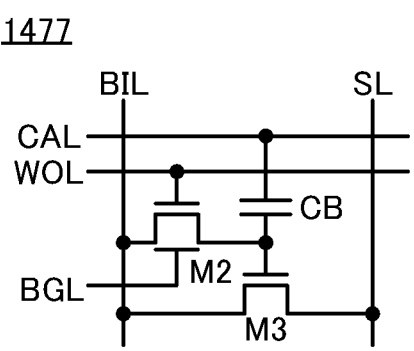

FIGS. 9A to 9C show circuit structure examples of a memory cell of a DRAM. In this specification and the like, a DRAM using a memory cell including one OS transistor and one capacitor is sometimes referred to as a DOSRAM (Dynamic Oxide Semiconductor Random Access Memory). A memory cell 1471 in FIG. 9A includes a transistor M1 and a capacitor CA. Note that the transistor M1 includes a gate (also referred to as a top gate in some cases) and a back gate.

A first terminal of the transistor M1 is connected to a first terminal of the capacitor CA. A second terminal of the transistor M1 is connected to a wiring BIL. The gate of the transistor M1 is connected to a wiring WOL. The back gate of the transistor M1 is connected to a wiring BGL. A second terminal of the capacitor CA is connected to a wiring CAL.

The wiring BIL functions as a bit line, and the wiring WOL functions as a word line. The wiring CAL functions as a wiring for applying a predetermined potential to the second terminal of the capacitor CA. In data writing and reading, a low-level potential is preferably applied to the wiring CAL. The wiring BGL functions as a wiring for applying a potential to the back gate of the transistor M1. By applying a given potential to the wiring BGL, the threshold voltage of the transistor M1 can be controlled.

The memory cell MC is not limited to the memory cell 1471, and its circuit structure can be changed. For example, like a memory cell 1472 in FIG. 9B, a structure may be used in which the back gate of the transistor M1 is connected not to the wiring BGL but to the wiring WOL in the memory cell MC. As another example, the memory cell MC may be configured with a single-gate transistor, that is, the transistor M1 that does not have a back gate, like a memory cell 1473 in FIG. 9C.

The use of an OS transistor as the transistor M1 enables the leakage current of the transistor M1 to be extremely low. That is, written data can be retained for a long time with the use of the transistor M1; thus, the frequency of refresh of the memory cell can be reduced. In addition, refresh operation for the memory cell can be omitted. In addition, since the transistor M1 has an extremely low leakage current, multi-level data or analog data can be retained in the memory cell 1471, the memory cell 1472, and the memory cell 1473.

In the DOSRAM, providing a sense amplifier below the memory cell array 1470 so that they overlap each other as described above can shorten the bit line. This reduces the bit line capacity, which reduces the storage capacity of the memory cell.

[NOSRAM]

FIGS. 9D to 9G show circuit structure examples of a gain-cell type memory cell including two transistors and one capacitor. A memory cell 1474 in FIG. 9D includes a transistor M2, a transistor M3, and a capacitor CB. Note that the transistor M2 includes a front gate (simply referred to as a gate in some cases) and a back gate. In this specification and the like, a memory device including a gain-cell memory cell using an OS transistor as the transistor M2 is referred to as a NOSRAM (Nonvolatile Oxide Semiconductor RAM) in some cases.

A first terminal of the transistor M2 is connected to a first terminal of the capacitor CB. A second terminal of the transistor M2 is connected to a wiring WBL. The gate of the transistor M2 is connected to the wiring WOL. The back gate of the transistor M2 is connected to the wiring BGL. A second terminal of the capacitor CB is connected to the wiring CAL. A second terminal of the capacitor CB is connected to the wiring CAL. A first terminal of the transistor M3 is connected to the wiring RBL, a second terminal of the transistor M3 is connected to the wiring SL, and a gate of the transistor M3 is connected to the first terminal of the capacitor CB.

The wiring WBL functions as a write bit line, the wiring RBL functions as a read bit line, and the wiring WOL functions as a word line. The wiring CAL functions as a wiring for applying a predetermined potential to the second terminal of the capacitor CB. In data writing, data retention, and data reading, a low-level potential is preferably applied to the wiring CAL. The wiring BGL functions as a wiring for applying a potential to the back gate of the transistor M2. By applying a given potential to the wiring BGL, the threshold voltage of the transistor M2 can be increased or decreased.

The memory cell MC is not limited to the memory cell 1474, and its circuit structure can be changed as appropriate. For example, like a memory cell 1475 in FIG. 9E, a structure may be used in which the back gate of the transistor M2 is connected not to the wiring BGL but to the wiring WOL in the memory cell MC. Alternatively, for example, like a memory cell 1476 in FIG. 9F, the memory cell MC may be a memory cell including a single-gate transistor, that is, the transistor M2 that does not include a back gate. For example, the memory cell MC may have a structure in which the wiring WBL and the wiring RBL are combined into one wiring BIL as in a memory cell 1477 in FIG. 9G.

When an OS transistor is used as the transistor M2, the leakage current of the transistor M2 can be extremely low. Consequently, written data can be retained for a long time with the use of the transistor M2; thus, the frequency of refresh of the memory cell can be reduced. In addition, refresh operation for the memory cell can be omitted. In addition, the extremely low leakage current allows multi-level data or analog data to be retained in the memory cell 1474. The same applies to the memory cell 1475 to the memory cell 1477.

Note that the transistor M3 may be a transistor containing silicon in a channel formation region (hereinafter such a transistor is referred to as a Si transistor in some cases). The conductivity type of the Si transistor may be an n-channel type or a p-channel type. A Si transistor has higher field-effect mobility than an OS transistor in some cases. Therefore, a Si transistor may be used as the transistor M3 functioning as a read transistor. Furthermore, the use of a Si transistor as the transistor M3 enables the transistor M2 to be stacked over the transistor M3, in which case the area occupied by the memory cell can be reduced and high integration of the memory device can be achieved.

Alternatively, the transistor M3 may be an OS transistor. When an OS transistor is used as each of the transistor M2 and the transistor M3, the circuit of the memory cell array 1470 can be formed using only n-channel transistors.

Figure 9H:
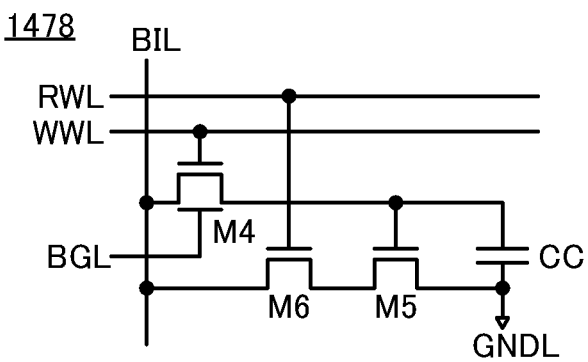

FIG. 9H shows an example of a gain-cell type memory cell including three transistors and one capacitor. A memory cell 1478 in FIG. 9H includes a transistor M4 to a transistor M6 and a capacitor CC. The capacitor CC is provided as necessary. The memory cell 1478 is electrically connected to the wiring BIL, a wiring RWL, a wiring WWL, the wiring BGL, and a wiring GNDL. The wiring GNDL is a wiring for supplying a low-level potential. Note that the memory cell 1478 may be electrically connected to the wiring RBL and the wiring WBL instead of the wiring BIL.

The transistor M4 is an OS transistor including a back gate, and the back gate is electrically connected to the wiring BGL. Note that the back gate and a gate of the transistor M4 may be electrically connected to each other. Alternatively, the transistor M4 does not necessarily include the back gate.

Note that each of the transistor M5 and the transistor M6 may be an n-channel Si transistor or a p-channel Si transistor. Alternatively, the transistor M4 to the transistor M6 may be OS transistors, in which case the circuit of the memory cell array 1470 can be formed using only re-channel transistors.

The use of an OS transistor as the transistor M4 enables the leakage current of the transistor M4 to be extremely low.

Note that the structures of the peripheral circuit 1411, the memory cell array 1470, and the like described in this embodiment are not limited to the above. The arrangement and functions of these circuits and the wirings, circuit components, and the like connected to the circuits can be changed, removed, or added as needed.

At least part of this embodiment can be implemented in combination with the other embodiments described in this specification as appropriate.

Embodiment 3

In this embodiment, a chip that can be used for the control unit or the like of the testing device of one embodiment of the present invention is described.

In this embodiment, an example of a chip 1200 is described using FIG. 10. A plurality of circuits (systems) are mounted on the chip 1200. The technology for integrating a plurality of circuits (systems) on one chip is referred to as system on chip (SoC) in some cases.

Figure 10A:
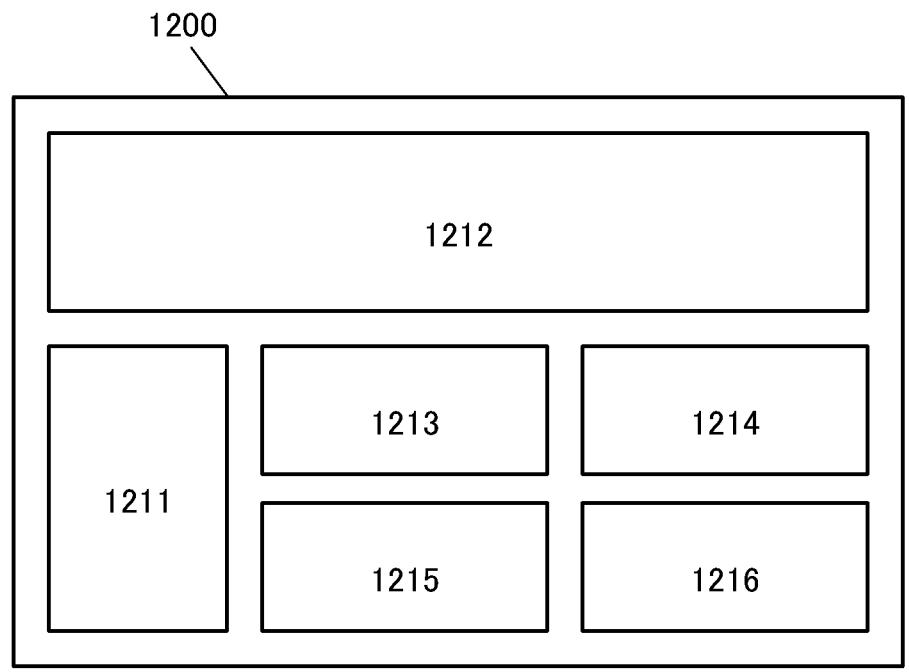
FIG. 10A and FIG. 10B are diagrams showing a structure example of a memory device.

As shown in FIG. 10A, the chip 1200 includes a CPU 1211, a GPU 1212, one or more of analog arithmetic units 1213, one or more of memory controllers 1214, one or more of interfaces 1215, one or more of network circuits 1216, and the like.

Figure 10B:
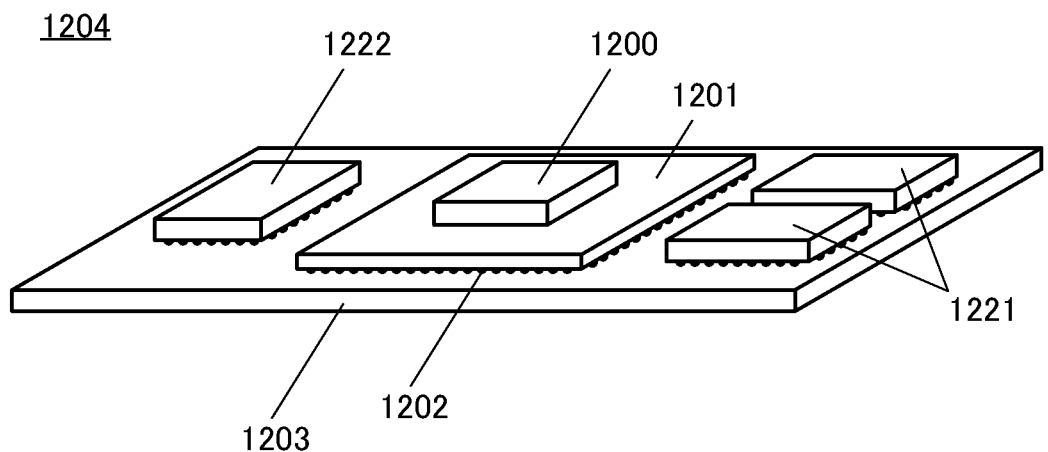

A bump (not shown) is provided on the chip 1200 and is connected to a first surface of a printed circuit board (PCB) 1201 as shown in FIG. 10B. A plurality of bumps 1202 are provided on the rear surface of the first surface of the PCB 1201 and are connected to a motherboard 1203.

Memory devices such as a DRAM 1221 and a flash memory 1222 may be provided over the motherboard 1203. For example, the DOSRAM described in the above embodiment can be used as the DRAM 1221. For example, the NOSRAM described in the above embodiment can be used as the flash memory 1222.

The CPU 1211 preferably includes a plurality of CPU cores. The GPU 1212 preferably includes a plurality of GPU cores. The CPU 1211 and the GPU 1212 may each include a memory for storing data temporarily. Alternatively, a common memory for the CPU 1211 and the GPU 1212 may be provided in the chip 1200. As the memory, the NOSRAM or the DOSRAM described above can be used. The GPU 1212 is suitable for parallel computation of a large number of data and thus can be used for image processing and product-sum operation. When an image processing circuit or a product-sum operation circuit using an oxide semiconductor of the present invention is provided in the GPU 1212, image processing and product-sum operation can be performed with low power consumption. In addition, the CPU 1211 and the GPU 1212 can preferably perform analog arithmetic operations.

Since the CPU 1211 and the GPU 1212 are provided in the same chip, a wiring between the CPU 1211 and the GPU 1212 can be shortened; accordingly, data transfer from the CPU 1211 to the GPU 1212, data transfer between the memories included in the CPU 1211 and the GPU 1212, and transfer of arithmetic operation results from the GPU 1212 to the CPU 1211 after the arithmetic operation in the GPU 1212 can be performed at high speed.

The analog arithmetic unit 1213 includes one or both of an A/D (analog/digital) converter circuit and a D/A (digital/analog) converter circuit. Furthermore, the analog arithmetic unit 1213 may include the above-described product-sum operation circuit.

The memory controller 1214 includes a circuit functioning as a controller of the DRAM 1221 and a circuit functioning as the interface of the flash memory 1222.

When the CPU 1211 or the GPU 1212 performs analog arithmetic operation, the memory controller 1214 preferably has a function of communicating analog data with the DRAM 1221 or the flash memory 1222.

The interface 1215 includes an interface circuit to be connected to an external device such as a display device, a speaker, a microphone, a camera, or a controller. Examples of the controller include a mouse, a keyboard, and a game controller. As such an interface, USB (Universal Serial Bus), HDMI (registered trademark) (High-Definition Multimedia Interface), or the like can be used.

The network circuit 1216 includes a network circuit such as a LAN (Local Area Network). The network circuit 1216 may further include a circuit for network security.

The circuits (systems) can be formed in the chip 1200 in the same manufacturing process. Therefore, even when the number of circuits needed for the chip 1200 increases, there is no need to increase the number of steps in the manufacturing process; thus, the chip 1200 can be manufactured at low cost.

The motherboard 1203 provided with the PCB 1201 on which the chip 1200 including the GPU 1212 is mounted, the DRAM 1221, and the flash memory 1222 can be referred to as a GPU module 1204.

The GPU module 1204 includes the chip 1200 using the SoC technology, and thus can have a small size. The GPU module 1204 is excellent in image processing, and thus is suitably used in portable electronic devices such as a smartphone, a tablet terminal, a laptop PC, and a portable (mobile) game console. Furthermore, the product-sum operation circuit using the GPU 1212 can execute a method in a deep neural network (DNN), a convolutional neural network (CNN), a recurrent neural network (RNN), an autoencoder, a deep Boltzmann machine (DBM), a deep belief network (DBN), or the like; thus, the chip 1200 can be used as an AI chip or the GPU module 1204 can be used as an AI system module.

Embodiment 4

In this embodiment, a structure example of a semiconductor device which can be used for the testing device of one embodiment of the present invention is described. The semiconductor device described below can be particularly used to the memory portion included in the control unit. Not limited to this, the semiconductor device can be used to the arithmetic unit, the timing-circuit unit, or the like.

Figure 11:
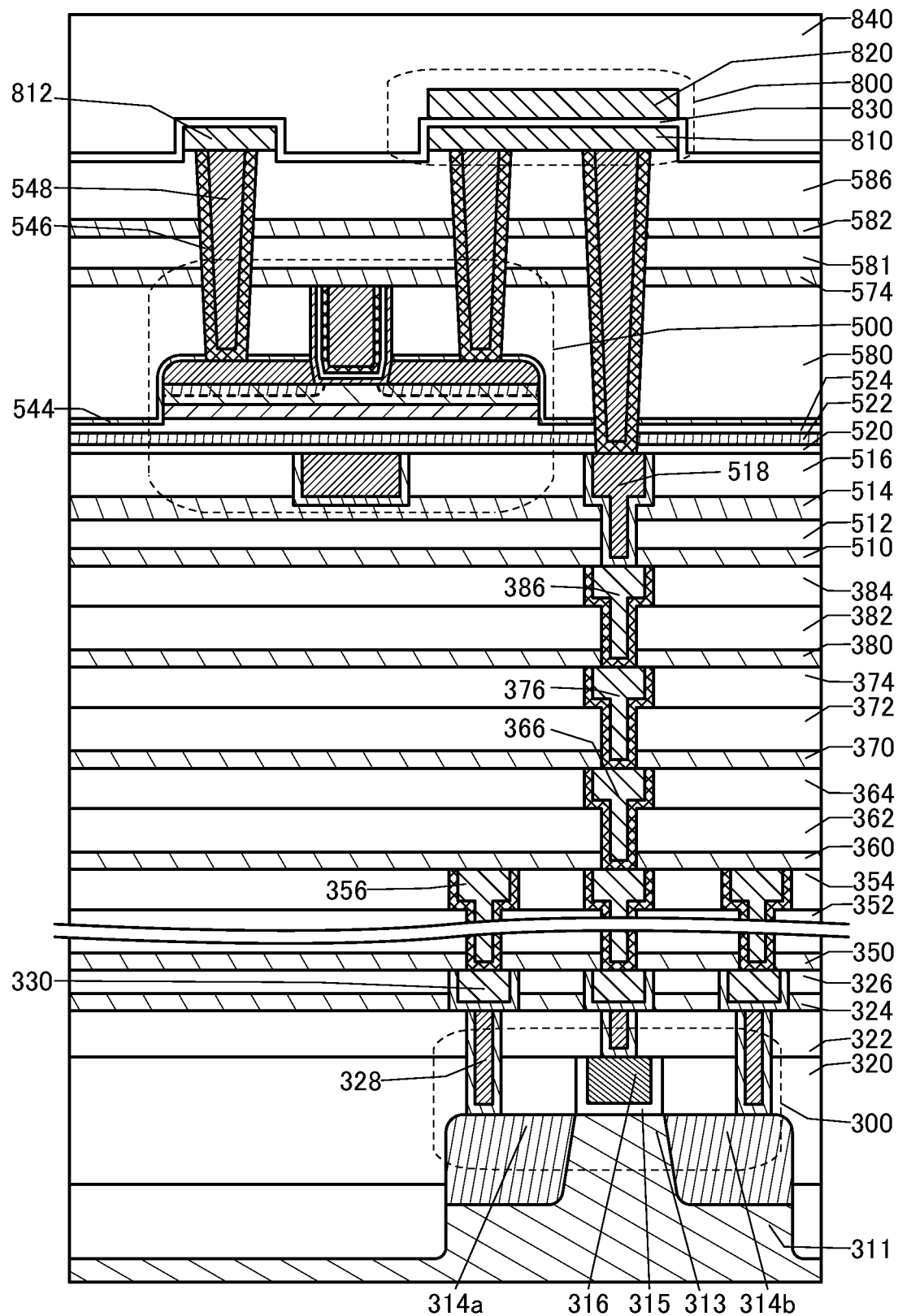
FIG. 11 is a diagram showing a structure example of a semiconductor device.
Figure 13A:
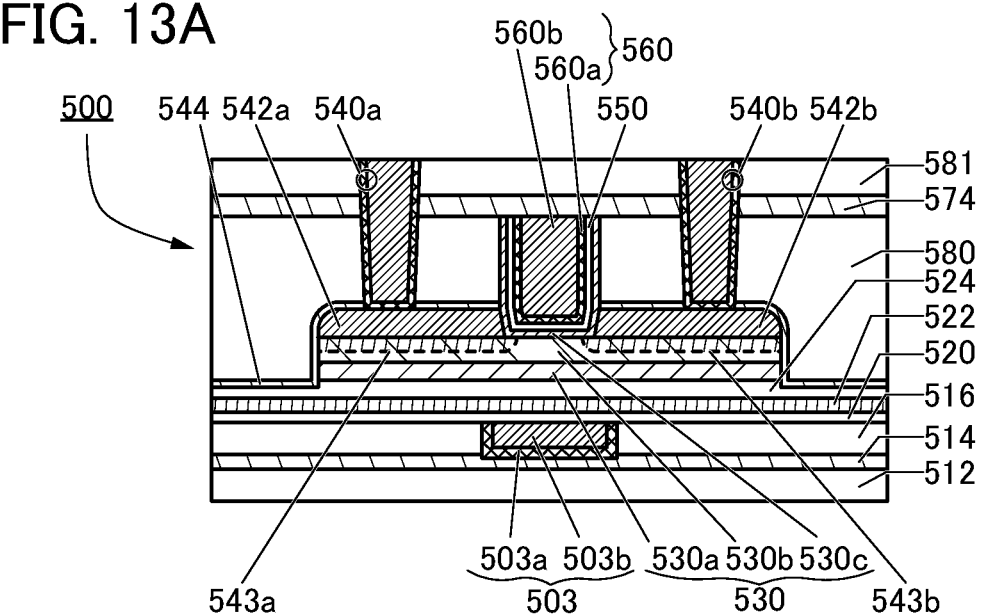
FIG. 13A to FIG. 13C are diagrams showing a structure example of a semiconductor device.
Figure 13B:
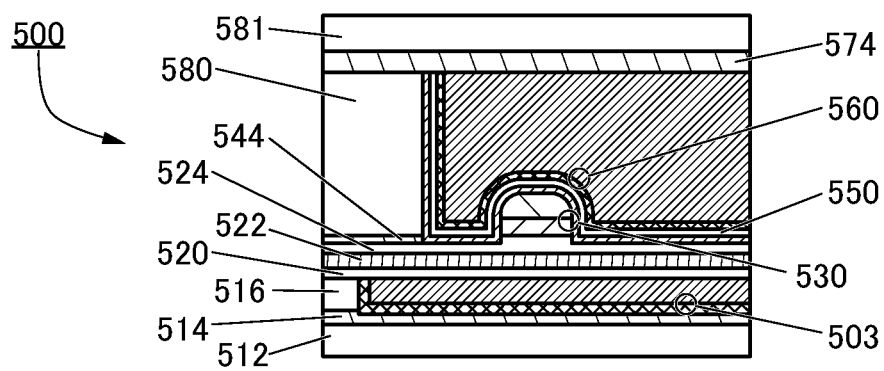
Figure 13C:
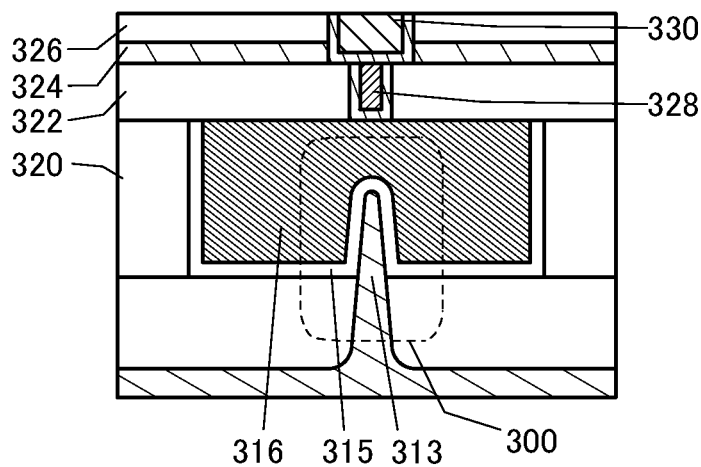

A semiconductor device in FIG. 11 includes a transistor 300, a transistor 500, and a capacitor 800. FIG. 13A is a cross-sectional view of the transistor 500 in the channel length direction, FIG. 13B is a cross-sectional view of the transistor 500 in the channel width direction, and FIG. 13C is a cross-sectional view of the transistor 300 in the channel width direction.

The transistor 500 is a transistor including a metal oxide in its channel formation region (an OS transistor). Since the off-state current of the transistor 500 is low, when the transistor 500 is used as an OS transistor included in the semiconductor device, written data can be retained for a long time.

The semiconductor device described in this embodiment includes the transistor 300, the transistor 500, and the capacitor 800, as shown in FIG. 11. The transistor 500 is provided above the transistor 300, and the capacitor 800 is provided above the transistor 300 and the transistor 500.

The transistor 300 is provided over a substrate 311 and includes a conductor 316, an insulator 315, a semiconductor region 313 that is part of the substrate 311, and a low-resistance region 314*a* and a low-resistance region 314*b* each functioning as a source region or a drain region. Note that the transistor 300 can be used as the transistor included in the memory in the above embodiment, for example.

As shown in FIG. 13C, in the transistor 300, a top surface and a side surface in the channel width direction of the semiconductor region 313 are covered with the conductor 316 with the insulator 315 therebetween. Such a Fin-type transistor 300 can have an increased effective channel width, and thus have improved on-state characteristics. In addition, since contribution of an electric field of a gate electrode can be increased, the off-state characteristics of the transistor 300 can be improved.

Note that the transistor 300 can be either a p-channel transistor or an n-channel transistor.

A region of the semiconductor region 313 where a channel is formed, a region in the vicinity thereof, the low-resistance region 314*a* and the low-resistance region 314*b* each functioning as a source region or a drain region, and the like preferably contain a semiconductor such as a silicon-based semiconductor, and preferably contain single crystal silicon. Alternatively, the regions may be formed using a material containing Ge (germanium), SiGe (silicon germanium), GaAs (gallium arsenide), GaAlAs (gallium aluminum arsenide), or the like. A structure may be used in which silicon whose effective mass is controlled by applying stress to the crystal lattice and changing the lattice spacing is used. Alternatively, the transistor 300 may be an HEMT (High Electron Mobility Transistor) with the use of GaAs and GaAlAs, or the like.

The low-resistance region 314*a* and the low-resistance region 314*b* contain an element which imparts n-type conductivity, such as arsenic or phosphorus, or an element which imparts p-type conductivity, such as boron, in addition to the semiconductor material used for the semiconductor region 313.

For the conductor 316 functioning as a gate electrode, a semiconductor material such as silicon containing the element which imparts n-type conductivity, such as arsenic or phosphorus, or the element which imparts p-type conductivity, such as boron, or a conductive material such as a metal material, an alloy material, or a metal oxide material can be used.

Note that since the work function of a conductor depends on the material of the conductor, the threshold voltage of the transistor can be adjusted by selecting the material of the conductor. Specifically, it is preferable to use a material such as titanium nitride or tantalum nitride for the conductor. Moreover, in order to ensure both conductivity and embeddability, it is preferable to use stacked layers of metal materials such as tungsten and aluminum for the conductor, and it is particularly preferable to use tungsten in terms of heat resistance.

Figure 12:
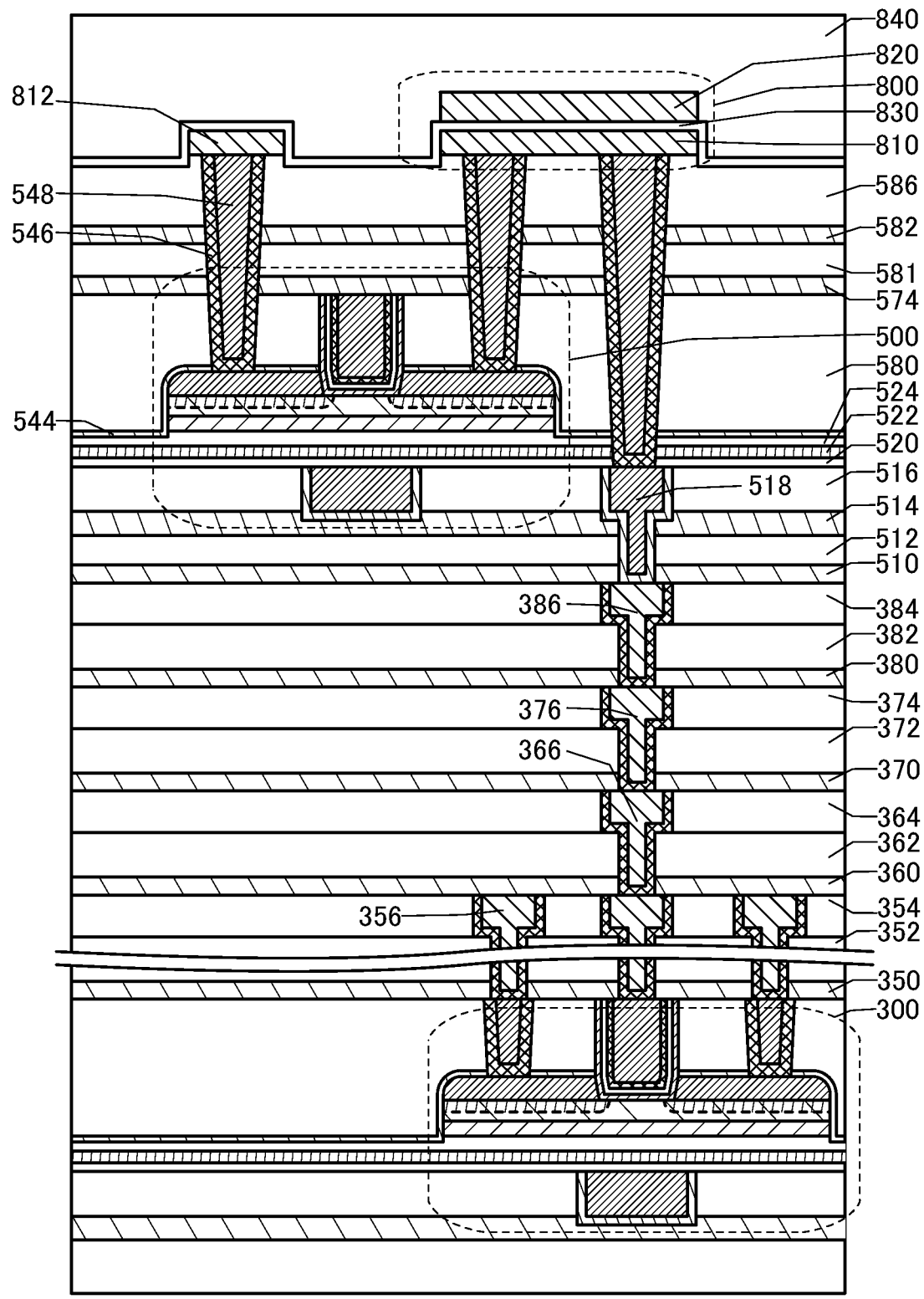
FIG. 12 is a diagram showing a structure example of a semiconductor device.

Note that the transistor 300 shown in FIG. 11 is an example and the structure is not limited thereto; an appropriate transistor is used in accordance with a circuit structure or a driving method. For example, when the semiconductor device is composed of only OS transistors, the transistor 300 has a structure similar to that of the transistor 500 using an oxide semiconductor, as shown in FIG. 12. Note that the details of the transistor 500 are described later.

An insulator 320, an insulator 322, an insulator 324, and an insulator 326 are stacked sequentially and provided to cover the transistor 300.

For the insulator 320, the insulator 322, the insulator 324, and the insulator 326, silicon oxide, silicon oxynitride, silicon nitride oxide, silicon nitride, aluminum oxide, aluminum oxynitride, aluminum nitride oxide, aluminum nitride, or the like is used, for example.

Note that in this specification, silicon oxynitride refers to a material that contains oxygen at a higher proportion than nitrogen, and silicon nitride oxide refers to a material that contains nitrogen at a higher proportion than oxygen. Furthermore, in this specification, aluminum oxynitride refers to a material that contains oxygen at a higher proportion than nitrogen, and aluminum nitride oxide refers to a material that contains nitrogen at a higher proportion than oxygen.

The insulator 322 may have a function of a planarization film for planarizing a level difference caused by the transistor 300 or the like provided below the insulator 322. For example, a top surface of the insulator 322 may be planarized by planarization treatment using a chemical mechanical polishing (CMP) method or the like to improve planarity.

In addition, for the insulator 324, it is preferable to use a film having a barrier property that prevents diffusion of hydrogen or impurities from the substrate 311, the transistor 300, or the like into a region where the transistor 500 is provided.

For the film having a barrier property against hydrogen, silicon nitride formed by a CVD method can be used, for example. Here, diffusion of hydrogen to a semiconductor element including an oxide semiconductor, such as the transistor 500, degrades the characteristics of the semiconductor element in some cases. Therefore, a film that inhibits hydrogen diffusion is preferably used between the transistor 500 and the transistor 300. The film that inhibits hydrogen diffusion is specifically a film from which a small amount of hydrogen is released.

The amount of released hydrogen can be analyzed by thermal desorption spectroscopy (TDS) or the like, for example. The amount of hydrogen released from the insulator 324 that is converted into hydrogen atoms per area of the insulator 324 is less than or equal to $10 \times 10^{15}$ atoms/cm$^2$, preferably less than or equal to $5 \times 10^{15}$ atoms/cm$^2$, in the TDS analysis in a film-surface temperature range of 50° C. to 500° C., for example.

Note that the dielectric constant of the insulator 326 is preferably lower than that of the insulator 324. For example, the dielectric constant of the insulator 326 is preferably lower than 4, further preferably lower than 3. The dielectric constant of the insulator 326 is, for example, preferably 0.7 times or less, further preferably 0.6 times or less the dielectric constant of the insulator 324. When a material with a low dielectric constant is used as an interlayer film, the parasitic capacitance generated between wirings can be reduced.

In addition, a conductor 328, a conductor 330, and the like that are connected to the capacitor 800 or the transistor 500 are embedded in the insulator 320, the insulator 322, the insulator 324, and the insulator 326. Note that the conductor 328 and the conductor 330 each have a function of a plug or a wiring. Furthermore, a plurality of conductors functioning as plugs or wirings are collectively denoted by the same reference numeral in some cases. Moreover, in this specification and the like, a wiring and a plug connected to the wiring may be a single component. That is, there are cases where part of a conductor functions as a wiring and part of a conductor functions as a plug.

As a material for each of the plugs and wirings (the conductor 328, the conductor 330, and the like), a single layer or a stacked layer of a conductive material such as a metal material, an alloy material, a metal nitride material, or a metal oxide material can be used. It is preferable to use a high-melting-point material that has both heat resistance and conductivity, such as tungsten or molybdenum, and it is preferable to use tungsten. Alternatively, it is preferable to form the plugs and wirings with a low-resistance conductive material such as aluminum or copper. The use of a low-resistance conductive material can reduce wiring resistance.

A wiring layer may be provided over the insulator 326 and the conductor 330. For example, in FIG. 11, an insulator 350, an insulator 352, and an insulator 354 are stacked sequentially and provided. Furthermore, a conductor 356 is formed in the insulator 350, the insulator 352, and the insulator 354. The conductor 356 has a function of a plug or a wiring that is connected to the transistor 300. Note that the conductor 356 can be provided using a material similar to those for the conductor 328 and the conductor 330.

Note that for example, as the insulator 350, like the insulator 324, an insulator having a barrier property against hydrogen is preferably used. Furthermore, the conductor 356 preferably contains a conductor having a barrier property against hydrogen. In particular, the conductor having a barrier property against hydrogen is formed in an opening of the insulator 350 having a barrier property against hydrogen. With this structure, the transistor 300 and the transistor 500 can be separated by a barrier layer, so that diffusion of hydrogen from the transistor 300 into the transistor 500 can be inhibited.

Note that for the conductor having a barrier property against hydrogen, tantalum nitride is preferably used, for example. In addition, the use of a stack including tantalum nitride and tungsten, which has high conductivity, can inhibit diffusion of hydrogen from the transistor 300 while the conductivity of a wiring is kept. In that case, a structure is preferable in which a tantalum nitride layer having a barrier property against hydrogen is in contact with the insulator 350 having a barrier property against hydrogen.

A wiring layer may be provided over the insulator 354 and the conductor 356. For example, in FIG. 11, an insulator 360, an insulator 362, and an insulator 364 are stacked sequentially and provided. Furthermore, a conductor 366 is formed in the insulator 360, the insulator 362, and the insulator 364. The conductor 366 has a function of a plug or a wiring. Note that the conductor 366 can be provided using a material similar to those for the conductor 328 and the conductor 330.

Note that for example, as the insulator 360, like the insulator 324, an insulator having a barrier property against hydrogen is preferably used. Furthermore, the conductor 366 preferably contains a conductor having a barrier property against hydrogen. In particular, the conductor having a barrier property against hydrogen is formed in an opening portion of the insulator 360 having a barrier property against hydrogen. With this structure, the transistor 300 and the transistor 500 can be separated by a barrier layer, so that diffusion of hydrogen from the transistor 300 into the transistor 500 can be inhibited.

A wiring layer may be provided over the insulator 364 and the conductor 366. For example, in FIG. 11, an insulator 370, an insulator 372, and an insulator 374 are stacked sequentially and provided. Furthermore, a conductor 376 is formed in the insulator 370, the insulator 372, and the insulator 374. The conductor 376 has a function of a plug or a wiring. Note that the conductor 376 can be provided using a material similar to those for the conductor 328 and the conductor 330.

Note that for example, as the insulator 370, like the insulator 324, an insulator having a barrier property against hydrogen is preferably used. Furthermore, the conductor 376 preferably contains a conductor having a barrier property against hydrogen. In particular, the conductor having a barrier property against hydrogen is formed in an opening portion of the insulator 370 having a barrier property against hydrogen. With this structure, the transistor 300 and the transistor 500 can be separated by a barrier layer, so that diffusion of hydrogen from the transistor 300 into the transistor 500 can be inhibited.

A wiring layer may be provided over the insulator 374 and the conductor 376. For example, in FIG. 11, an insulator 380, an insulator 382, and an insulator 384 are stacked sequentially and provided. Furthermore, a conductor 386 is formed in the insulator 380, the insulator 382, and the insulator 384. The conductor 386 has a function of a plug or a wiring. Note that the conductor 386 can be provided using a material similar to those for the conductor 328 and the conductor 330.

Note that for example, as the insulator 380, like the insulator 324, an insulator having a barrier property against hydrogen is preferably used. Furthermore, the conductor 386 preferably contains a conductor having a barrier property against hydrogen. In particular, the conductor having a barrier property against hydrogen is formed in an opening portion of the insulator 380 having a barrier property against hydrogen. With this structure, the transistor 300 and the transistor 500 can be separated by a barrier layer, so that diffusion of hydrogen from the transistor 300 into the transistor 500 can be inhibited.

Although the wiring layer including the conductor 356, the wiring layer including the conductor 366, the wiring layer including the conductor 376, and the wiring layer including the conductor 386 are described above, the semiconductor device of this embodiment is not limited thereto. Three or less wiring layers that are similar to the wiring layer including the conductor 356 may be provided, or five or more wiring layers that are similar to the wiring layer including the conductor 356 may be provided.

An insulator 510, an insulator 512, an insulator 514, and an insulator 516 are stacked sequentially and provided over the insulator 384. A substance having a barrier property against oxygen or hydrogen is preferably used for any of the insulator 510, the insulator 512, the insulator 514, and the insulator 516.

For example, for the insulator 510 and the insulator 514, it is preferable to use a film having a barrier property that prevents diffusion of hydrogen or impurities from the substrate 311, a region where the transistor 300 is provided, or the like into the region where the transistor 500 is provided. Therefore, a material similar to that for the insulator 324 can be used.

For the film having a barrier property against hydrogen, silicon nitride formed by a CVD method can be used, for example. Here, diffusion of hydrogen to a semiconductor element including an oxide semiconductor, such as the transistor 500, degrades the characteristics of the semiconductor element in some cases. Therefore, a film that inhibits hydrogen diffusion is preferably used between the transistor 500 and the transistor 300. The film that inhibits hydrogen diffusion is specifically a film from which a small amount of hydrogen is released.

In addition, for the film having a barrier property against hydrogen, a metal oxide such as aluminum oxide, hafnium oxide, or tantalum oxide is preferably used for the insulator 510 and the insulator 514, for example.

In particular, aluminum oxide has an excellent blocking effect that prevents the passage of both oxygen and impurities such as hydrogen and moisture, which are factors of a change in electrical characteristics of the transistor. Accordingly, aluminum oxide can prevent mixing of impurities such as hydrogen and moisture into the transistor 500 in a manufacturing process and after manufacturing of the transistor. In addition, release of oxygen from the oxide included in the transistor 500 can be inhibited. Therefore, aluminum oxide is suitably used for a protective film of the transistor 500.

In addition, for the insulator 512 and the insulator 516, a material similar to that for the insulator 320 can be used, for example. Furthermore, when a material with a comparatively low dielectric constant is used for these insulators, parasitic capacitance generated between wirings can be reduced. A silicon oxide film, a silicon oxynitride film, or the like can be used for the insulator 512 and the insulator 516, for example.

Furthermore, a conductor 518, a conductor included in the transistor 500 (a conductor 503 for example), and the like are embedded in the insulator 510, the insulator 512, the insulator 514, and the insulator 516. Note that the conductor 518 has a function of a plug or a wiring that is connected to the capacitor 800 or the transistor 300. The conductor 518 can be provided using a material similar to those for the conductor 328 and the conductor 330.

In particular, the conductor 518 in a region in contact with the insulator 510 and the insulator 514 is preferably a conductor having a barrier property against oxygen, hydrogen, and water. With this structure, the transistor 300 and the transistor 500 can be separated by a layer having a barrier property against oxygen, hydrogen, and water; thus, diffusion of hydrogen from the transistor 300 into the transistor 500 can be inhibited.

The transistor 500 is provided above the insulator 516.

As shown in FIG. 13A and FIG. 13B, the transistor 500 includes the conductor 503 positioned to be embedded in the insulator 514 and the insulator 516; an insulator 520 positioned over the insulator 516 and the conductor 503; an insulator 522 positioned over the insulator 520; an insulator 524 positioned over the insulator 522; an oxide 530a positioned over the insulator 524; an oxide 530b positioned over the oxide 530a; a conductor 542a and a conductor 542b positioned apart from each other over the oxide 530b; an insulator 580 that is positioned over the conductor 542a and the conductor 542b and is provided with an opening formed to overlap with a region between the conductor 542a and the conductor 542b; an oxide 530c positioned on a bottom and a side surface of the opening; an insulator 550 positioned on a formation surface of the oxide 530c; and a conductor 560 positioned on a formation surface of the insulator 550.

In addition, as shown in FIG. 13A and FIG. 13B, an insulator 544 is preferably positioned between the insulator 580 and the oxide 530a, the oxide 530b, the conductor 542a, and the conductor 542b. Furthermore, as shown in FIG. 13A and FIG. 13B, the conductor 560 preferably includes a conductor 560a provided inside the insulator 550 and a conductor 560b provided to be embedded inside the conductor 560a. Moreover, as shown in FIG. 13A and FIG. 13B, an insulator 574 is preferably positioned over the insulator 580, the conductor 560, and the insulator 550.

Note that in the following description, the oxide 530a, the oxide 530b, and the oxide 530c are sometimes/collectively referred to as an oxide 530.

Note that although a structure of the transistor 500 in which three layers of the oxide 530a, the oxide 530b, and the oxide 530c are stacked in a region where a channel is formed and its vicinity is shown, the present invention is not limited thereto. For example, a single layer of the oxide 530b, a two-layer structure of the oxide 530b and the oxide 530a, a two-layer structure of the oxide 530b and the oxide 530c, or a stacked-layer structure of four or more layers may be employed. Furthermore, although the conductor 560 is shown to have a stacked-layer structure of two layers in the transistor 500, the present invention is not limited thereto. For example, the conductor 560 may have a single-layer structure or a stacked-layer structure of three or more layers. Moreover, the transistor 500 shown in FIG. 11, FIG. 13A is an example and the structure is not limited thereto; an appropriate transistor is used in accordance with a circuit configuration or a driving method.

Here, the conductor 560 functions as a gate electrode of the transistor, and the conductor 542a and the conductor 542b each function as a source electrode or a drain electrode. As described above, the conductor 560 is formed to be embedded in the opening of the insulator 580 and the region between the conductor 542a and the conductor 542b. The positions of the conductor 560, the conductor 542a, and the conductor 542b with respect to the opening of the insulator 580 are selected in a self-aligned manner. That is, in the transistor 500, the gate electrode can be positioned between the source electrode and the drain electrode in a self-aligned manner. Therefore, the conductor 560 can be formed without an alignment margin, resulting in a reduction in the area occupied by the transistor 500. Accordingly, miniaturization and high integration of the semiconductor device can be achieved.

In addition, since the conductor 560 is formed in the region between the conductor 542a and the conductor 542b in a self-aligned manner, the conductor 560 does not have a region overlapping with the conductor 542a or the conductor 542b. Thus, parasitic capacitance formed between the conductor 560 and each of the conductor 542a and the conductor 542b can be reduced. As a result, the switching speed of the transistor 500 can be improved, and the transistor 500 can have high frequency characteristics.

The conductor 560 sometimes functions as a first gate (also referred to as top gate) electrode. In addition, the conductor 503 sometimes functions as a second gate (also referred to as bottom gate) electrode. In that case, the threshold voltage of the transistor 500 can be controlled by changing a potential applied to the conductor 503 independently of a potential applied to the conductor 560. In particular, the threshold voltage of the transistor 500 can be higher than 0 V and the off-state current can be reduced by applying a negative potential to the conductor 503. Thus, a drain current at the time when a potential applied to the conductor 560 is 0 V can be lower in the case where a negative potential is applied to the conductor 503 than in the case where a negative potential is not applied to the conductor 503.

The conductor 503 is positioned to overlap with the oxide 530 and the conductor 560. Thus, in the case where potentials are applied to the conductor 560 and the conductor 503, an electric field generated from the conductor 560 and an electric field generated from the conductor 503 are connected, so that a channel formation region formed in the oxide 530 can be covered. In this specification and the like, a transistor structure in which a channel formation region is electrically surrounded by electric fields of a first gate electrode and a second gate electrode is referred to as a surrounded channel (S-channel) structure.

In addition, the conductor 503 has a structure similar to that of the conductor 518; a conductor 503a is formed in contact with an inner wall of an opening in the insulator 514 and the insulator 516, and a conductor 503b is formed on the inner side. Note that although the transistor 500 having a structure in which the conductor 503a and the conductor 503b are stacked is shown, the present invention is not limited thereto. For example, the conductor 503 may be provided as a single layer or to have a stacked-layer structure of three or more layers.

Here, for the conductor 503a, a conductive material that has a function of inhibiting diffusion of impurities such as a hydrogen atom, a hydrogen molecule, a water molecule, and a copper atom (through which the impurities are less likely to pass) is preferably used. Alternatively, it is preferable to use a conductive material that has a function of inhibiting diffusion of oxygen (e.g., at least one of an oxygen atom, an oxygen molecule, and the like) (through which oxygen is less likely to pass). Note that in this specification, a function of inhibiting diffusion of impurities or oxygen means a function of inhibiting diffusion of any one or all of the impurities and oxygen.

For example, when the conductor 503a has a function of inhibiting diffusion of oxygen, a reduction in conductivity of the conductor 503b due to oxidation can be inhibited.

In addition, in the case where the conductor 503 also functions as a wiring, a conductive material with high conductivity that contains tungsten, copper, or aluminum as its main component is preferably used for the conductor 503b. In that case, the conductor 505 is not necessarily provided. Note that the conductor 503b is shown as a single layer but may have a stacked-layer structure, for example, a stack of the above conductive material and titanium or titanium nitride.

The insulator 520, the insulator 522, the insulator 524, and the insulator 550 have a function of a second gate insulating film.

Here, as the insulator 524 in contact with the oxide 530, an insulator that contains oxygen more than oxygen in the stoichiometric composition is preferably used. That is, an excess-oxygen region is preferably formed in the insulator 524. When such an insulator containing excess oxygen is provided in contact with the oxide 530, oxygen vacancies in the oxide 530 can be reduced and the reliability of the transistor 500 can be improved.

As the insulator including an excess-oxygen region, specifically, an oxide material that releases part of oxygen by heating is preferably used. An oxide that releases oxygen by heating is an oxide film in which the amount of released oxygen converted into oxygen atoms is greater than or equal to $1.0 \times 10^{18}$ atoms/cm$^3$, preferably greater than or equal to $1.0 \times 10^{19}$ atoms/cm$^3$, further preferably greater than or equal to $2.0 \times 10^{19}$ atoms/cm$^3$ or greater than or equal to $3.0 \times 10^{20}$ atoms/cm$^3$ in TDS (Thermal Desorption Spectroscopy) analysis. Note that the temperature of the film surface in the TDS analysis is preferably in a range of higher than or equal to 100° C. and lower than or equal to 700° C., or higher than or equal to 100° C. and lower than or equal to 400° C.

In addition, in the case where the insulator 524 includes an excess-oxygen region, it is preferable that the insulator 522 have a function of inhibiting diffusion of oxygen (e.g., an oxygen atom, an oxygen molecule, or the like) (through which oxygen is less likely to pass).

When the insulator 522 has a function of inhibiting diffusion of oxygen or impurities, oxygen contained in the oxide 530 is not diffused into the insulator 520 side, which is preferable. Furthermore, the conductor 503 can be inhibited from reacting with oxygen contained in the insulator 524 or the oxide 530.

For the insulator 522, a single layer or stacked layers of an insulator containing what is called a high-k material such as aluminum oxide, hafnium oxide, an oxide containing aluminum and hafnium (hafnium aluminate), tantalum oxide, zirconium oxide, lead zirconate titanate (PZT), strontium titanate (SrTiO$_3$), or (Ba,Sr)TiO$_3$ (BST) are preferably used, for example. As miniaturization and high integration of transistors progress, a problem such as leakage current might arise because of a thinner gate insulating film. When a high-k material is used for an insulator functioning as the gate insulating film, a gate potential during transistor operation can be reduced while the physical thickness is maintained.

It is particularly preferable to use an insulator containing an oxide of one or both of aluminum and hafnium, which is/are an insulating material having a function of inhibiting diffusion of impurities, oxygen, and the like (through which oxygen is less likely to pass). Aluminum oxide, hafnium oxide, an oxide containing aluminum and hafnium (hafnium aluminate), or the like is preferably used as the insulator containing an oxide of one or both of aluminum and hafnium. In the case where the insulator 522 is formed using such a material, the insulator 522 functions as a layer that inhibits release of oxygen from the oxide 530 and mixing of impurities such as hydrogen from the periphery of the transistor 500 into the oxide 530.

Alternatively, aluminum oxide, bismuth oxide, germanium oxide, niobium oxide, silicon oxide, titanium oxide, tungsten oxide, yttrium oxide, or zirconium oxide may be added to these insulators, for example. Alternatively, these insulators may be subjected to nitriding treatment. The insulator over which silicon oxide, silicon oxynitride, or silicon nitride is stacked may be used.

In addition, it is preferable that the insulator 520 be thermally stable. For example, silicon oxide and silicon oxynitride are suitable because they are thermally stable. Furthermore, the combination of an insulator that is a high-k material and silicon oxide or silicon oxynitride enables the insulator 520 and an insulator 526 to have a stacked-layer structure that has thermal stability and a high dielectric constant.

Note that in the transistor 500 in FIG. 13A and FIG. 13B, the insulator 520, the insulator 522, and the insulator 524 are shown as the second gate insulating film having a stacked-layer structure of three layers; however, the second gate insulating film may be a single layer or may have a stacked-layer structure of two layers or four or more layers. In such cases, without limitation to a stacked-layer structure formed of the same material, a stacked-layer structure formed of different materials may be employed.

In the transistor 500, a metal oxide functioning as an oxide semiconductor is preferably used as the oxide 530 including the channel formation region. For example, as the oxide 530, a metal oxide such as an In-M-Zn oxide (the element M is one kind or a plurality of kinds selected from aluminum, gallium, yttrium, copper, vanadium, beryllium, boron, titanium, iron, nickel, germanium, zirconium, molybdenum, lanthanum, cerium, neodymium, hafnium, tantalum, tungsten, magnesium, and the like) is preferably used. The In-M-Zn oxide that can be used as the oxide 530 is particularly preferably a CAAC-OS or a CAC-OS described later. Furthermore, as the oxide 530, an In—Ga oxide or an In—Zn oxide may be used.

The metal oxide functioning as the channel formation region in the oxide 530 has a band gap of more than or equal to 2 eV, preferably more than or equal to 2.5 eV. With the use of a metal oxide having such a wide bandgap, the off-state current of the transistor can be reduced.

When the oxide 530 includes the oxide 530a under the oxide 530b, it is possible to inhibit diffusion of impurities into the oxide 530b from the components formed below the oxide 530a. Moreover, including the oxide 530c over the oxide 530b makes it possible to inhibit diffusion of impurities into the oxide 530b from the components formed above the oxide 530c.

Note that the oxide 530 preferably has a stacked-layer structure of oxides that differ in the atomic ratio of metal atoms. Specifically, the atomic ratio of the element M to the constituent elements in the metal oxide used as the oxide 530a is preferably higher than the atomic ratio of the element M to the constituent elements in the metal oxide used as the oxide 530b. In addition, the atomic ratio of the element M to In in the metal oxide used as the oxide 530a is preferably higher than the atomic ratio of the element M to In in the metal oxide used as the oxide 530b. Furthermore, the atomic ratio of In to the element M in the metal oxide used as the oxide 530b is preferably higher than the atomic ratio of In to the element M in the metal oxide used as the oxide 530a. Moreover, a metal oxide that can be used as the oxide 530a or the oxide 530b can be used as the oxide 530c.

In addition, the energy of the conduction band minimum of each of the oxide 530a and the oxide 530c is preferably higher than the energy of the conduction band minimum of the oxide 530b. In other words, the electron affinity of each of the oxide 530a and the oxide 530c is preferably smaller than the electron affinity of the oxide 530b.

Here, the energy level of the conduction band minimum gradually changes at junction portions of the oxide 530a, the oxide 530b, and the oxide 530c. In other words, the energy level of the conduction band minimum at the junction portions of the oxide 530a, the oxide 530b, and the oxide 530c continuously changes or is continuously connected. To change the energy level gradually, the densities of defect states in mixed layers formed at an interface between the oxide 530a and the oxide 530b and an interface between the oxide 530b and the oxide 530c is preferably made low.

Specifically, when the oxide 530a and the oxide 530b or the oxide 530b and the oxide 530c contain a common element (as a main component) in addition to oxygen, a mixed layer with a low density of defect states can be formed. For example, in the case where the oxide 530b is an In—Ga—Zn oxide, an In—Ga—Zn oxide, a Ga—Zn oxide, gallium oxide, or the like is preferably used as the oxide 530a and the oxide 530c.

At this time, the oxide 530b serves as a main carrier path. When the oxide 530a and the oxide 530c have the above structures, the densities of defect states at the interface between the oxide 530a and the oxide 530b and the interface between the oxide 530b and the oxide 530c can be made low. Thus, the influence of interface scattering on carrier conduction is small, and the transistor 500 can have a high on-state current.

The conductor 542a and the conductor 542b functioning as the source electrode and the drain electrode are provided over the oxide 530b. For the conductor 542a and conductor 542b, it is preferable to use a metal element selected from aluminum, chromium, copper, silver, gold, platinum, tantalum, nickel, titanium, molybdenum, tungsten, hafnium, vanadium, niobium, manganese, magnesium, zirconium, beryllium, indium, ruthenium, iridium, strontium, and lanthanum; an alloy containing the above metal element; an alloy containing a combination of the above metal element; or the like. For example, it is preferable to use tantalum nitride, titanium nitride, tungsten, a nitride containing titanium and aluminum, a nitride containing tantalum and aluminum, ruthenium oxide, ruthenium nitride, an oxide containing strontium and ruthenium, an oxide containing lanthanum and nickel, or the like. In addition, tantalum nitride, titanium nitride, a nitride containing titanium and aluminum, a nitride containing tantalum and aluminum, ruthenium oxide, ruthenium nitride, an oxide containing strontium and ruthenium, and an oxide containing lanthanum and nickel are preferable because they are oxidation-resistant conductive materials or materials that retain their conductivity even after absorbing oxygen. Furthermore, a metal nitride film of tantalum nitride or the like is preferable because it has a barrier property against hydrogen or oxygen.

In addition, although the conductor 542a and the conductor 542b each having a single-layer structure are shown in FIG. 13, a stacked-layer structure of two or more layers may be employed. For example, it is preferable to stack a tantalum nitride film and a tungsten film. Alternatively, a titanium film and an aluminum film may be stacked. Alternatively, a two-layer structure where an aluminum film is stacked over a tungsten film, a two-layer structure where a copper film is stacked over a copper-magnesium-aluminum alloy film, a two-layer structure where a copper film is stacked over a titanium film, or a two-layer structure where a copper film is stacked over a tungsten film may be employed.

Other examples include a three-layer structure where a titanium film or a titanium nitride film is formed, an aluminum film or a copper film is stacked over the titanium film or the titanium nitride film, and a titanium film or a titanium nitride film is formed over the aluminum film or the copper film; and a three-layer structure where a molybdenum film or a molybdenum nitride film is formed, an aluminum film or a copper film is stacked over the molybdenum film or the molybdenum nitride film, and a molybdenum film or a molybdenum nitride film is formed over the aluminum film or the copper film. Note that a transparent conductive material containing indium oxide, tin oxide, or zinc oxide may be used.

In addition, as shown in FIG. 13A or the like, a region 543a and a region 543b are sometimes formed as low-resistance regions at an interface between the oxide 530 and the conductor 542a (the conductor 542b) and in the vicinity of the interface. In that case, the region 543a functions as one of a source region and a drain region, and the region 543b functions as the other of the source region and the drain region. Furthermore, the channel formation region is formed in a region between the region 543a and the region 543b.

When the conductor 542a (the conductor 542b) is provided to be in contact with the oxide 530, the oxygen concentration in the region 543a (the region 543b) sometimes decreases. In addition, a metal compound layer that contains the metal contained in the conductor 542a (the conductor 542b) and the component of the oxide 530 is sometimes formed in the region 543a (the region 543b). In such a case, the carrier density of the region 543a (the region 543b) increases, and the region 543a (the region 543b) becomes a low-resistance region.

The insulator 544 is provided to cover the conductor 542a and the conductor 542b and inhibits oxidation of the conductor 542a and the conductor 542b. At this time, the insulator 544 may be provided to cover a side surface of the oxide 530 and to be in contact with the insulator 524.

A metal oxide containing one kind or two or more kinds selected from hafnium, aluminum, gallium, yttrium, zirconium, tungsten, titanium, tantalum, nickel, germanium, neodymium, lanthanum, magnesium, and the like can be used as the insulator 544. Alternatively, silicon nitride oxide, silicon nitride, or the like can be used as the insulator 544.

It is particularly preferable to use an insulator containing an oxide of one or both of aluminum and hafnium, such as aluminum oxide, hafnium oxide, or an oxide containing aluminum and hafnium (hafnium aluminate), as the insulator 544. In particular, hafnium aluminate has higher heat resistance than a hafnium oxide film. Therefore, hafnium aluminate is preferable because it is less likely to be crystallized by heat treatment in a later step. Note that the insulator 544 is not an essential component when the conductor 542*a* and the conductor 542*b* are oxidation-resistant materials or do not significantly lose their conductivity even after absorbing oxygen. Design is appropriately set in consideration of required transistor characteristics.

When the insulator 544 is included, diffusion of impurities such as water and hydrogen contained in the insulator 580 into the oxide 530*b* through the oxide 530*c* and the insulator 550 can be inhibited. Furthermore, oxidation of the conductor 560 due to excess oxygen contained in the insulator 580 can be inhibited.

The insulator 550 functions as a first gate insulating film. The insulator 550 is preferably positioned in contact with an inner side (a top surface and a side surface) of the oxide 530*c*. Like the insulator 524, the insulator 550 is preferably formed using an insulator that contains excess oxygen and releases oxygen by heating.

Specifically, silicon oxide containing excess oxygen, silicon oxynitride, silicon nitride oxide, silicon nitride, silicon oxide to which fluorine is added, silicon oxide to which carbon is added, silicon oxide to which carbon and nitrogen are added, or porous silicon oxide can be used. In particular, silicon oxide and silicon oxynitride are preferable because they are thermally stable.

When an insulator from which oxygen is released by heating is provided as the insulator 550 in contact with the top surface of the oxide 530*c*, oxygen can be effectively supplied from the insulator 550 to the channel formation region of the oxide 530*b* through the oxide 530*c*. Furthermore, as in the insulator 524, the concentration of impurities such as water or hydrogen in the insulator 550 is preferably lowered. The thickness of the insulator 550 is preferably greater than or equal to 1 nm and less than or equal to 20 nm.

Furthermore, to efficiently supply excess oxygen contained in the insulator 550 to the oxide 530, a metal oxide may be provided between the insulator 550 and the conductor 560. The metal oxide preferably inhibits diffusion of oxygen from the insulator 550 to the conductor 560. Providing the metal oxide that inhibits diffusion of oxygen inhibits diffusion of excess oxygen from the insulator 550 to the conductor 560. That is, a reduction in the amount of excess oxygen supplied to the oxide 530 can be inhibited. Moreover, oxidation of the conductor 560 due to excess oxygen can be inhibited. As the metal oxide, a material that can be used as the insulator 544 is used.

Note that the insulator 550 may have a stacked-layer structure like the second gate insulating film. As miniaturization and high integration of transistors progress, a problem such as leakage current might arise because of a thinner gate insulating film. For that reason, when the insulating film functioning as the gate insulating film has a stacked-layer structure of a high-k material and a thermally stable material, a gate potential during transistor operation can be reduced while the physical thickness is maintained. Furthermore, the stacked-layer structure can be thermally stable and have a high dielectric constant.

Although the conductor 560 that functions as the first gate electrode and has a two-layer structure is shown in FIG. 13A and FIG. 13B, a single-layer structure or a stacked-layer structure of three or more layers may be employed.

As the conductor 560*a*, it is preferable to use a conductive material having a function of inhibiting diffusion of impurities such as a hydrogen atom, a hydrogen molecule, a water molecule, a nitrogen atom, a nitrogen molecule, a nitrogen oxide molecule (e.g., $N_2O$, $NO$, $NO_2$), and a copper atom. Alternatively, it is preferable to use a conductive material having a function of inhibiting diffusion of oxygen (e.g., at least one of an oxygen atom and an oxygen molecule). When the conductor 560*a* has a function of inhibiting diffusion of oxygen, it is possible to inhibit a reduction in conductivity of the conductor 560*b* due to oxidation caused by oxygen contained in the insulator 550. As a conductive material having a function of inhibiting diffusion of oxygen, for example, tantalum, tantalum nitride, ruthenium, ruthenium oxide, or the like is preferably used. For the conductor 560*a*, the oxide semiconductor that can be used as the oxide 530 can be used. In that case, when the conductor 560*b* is deposited by a sputtering method, the conductor 560*a* can have a reduced electrical resistance value to be a conductor. Such a conductor can be referred to as an OC (Oxide Conductor) electrode.

In addition, a conductive material containing tungsten, copper, or aluminum as its main component is preferably used for the conductor 560*b*. Furthermore, the conductor 560*b* also functions as a wiring and thus a conductor having high conductivity is preferably used as the conductor 560*b*. For example, a conductive material containing tungsten, copper, or aluminum as its main component can be used. Moreover, the conductor 560*b* may have a stacked-layer structure, for example, a stacked-layer structure of the above conductive material and titanium or titanium nitride.

The insulator 580 is provided over the conductor 542*a* and the conductor 542*b* with the insulator 544 therebetween. The insulator 580 preferably includes an excess-oxygen region. For example, the insulator 580 preferably contains silicon oxide, silicon oxynitride, silicon nitride oxide, silicon nitride, silicon oxide to which fluorine is added, silicon oxide to which carbon is added, silicon oxide to which carbon and nitrogen are added, porous silicon oxide, resin, or the like. In particular, silicon oxide and silicon oxynitride are preferable because they are thermally stable. In particular, silicon oxide and porous silicon oxide are preferable because an excess-oxygen region can be easily formed in a later step.

The insulator 580 preferably includes an excess-oxygen region. When the insulator 580 that releases oxygen by heating is provided in contact with the oxide 530*c*, oxygen in the insulator 580 can be efficiently supplied to the oxide 530 through the oxide 530*c*. Note that the concentration of impurities such as water or hydrogen in the insulator 580 is preferably reduced.

The opening of the insulator 580 is formed to overlap with the region between the conductor 542*a* and the conductor 542*b*. Accordingly, the conductor 560 is formed to be embedded in the opening of the insulator 580 and the region between the conductor 542*a* and the conductor 542*b*.

The gate length needs to be short for miniaturization of the semiconductor device, but it is necessary to prevent a reduction in conductivity of the conductor 560. When the conductor 560 is made thick to achieve this, the conductor 560 might have a shape with a high aspect ratio. In this embodiment, the conductor 560 is provided to be embedded in the opening of the insulator 580; thus, even when the conductor 560 has a shape with a high aspect ratio, the conductor 560 can be formed without collapsing during the process.

The insulator 574 is preferably provided in contact with a top surface of the insulator 580, a top surface of the conductor 560, and a top surface of the insulator 550. When the insulator 574 is deposited by a sputtering method, excess-oxygen regions can be provided in the insulator 550 and the insulator 580. Accordingly, oxygen can be supplied from the excess-oxygen regions to the oxide 530.

For example, a metal oxide containing one kind or two or more kinds selected from hafnium, aluminum, gallium, yttrium, zirconium, tungsten, titanium, tantalum, nickel, germanium, magnesium, and the like can be used as the insulator 574.

In particular, aluminum oxide has a high barrier property, and even a thin aluminum oxide film having a thickness of greater than or equal to 0.5 nm and less than or equal to 3.0 nm can inhibit diffusion of hydrogen and nitrogen. Accordingly, aluminum oxide deposited by a sputtering method serves as an oxygen supply source and can also have a function of a barrier film against impurities such as hydrogen.

In addition, an insulator 581 functioning as an interlayer film is preferably provided over the insulator 574. As in the insulator 524 or the like, the concentration of impurities such as water or hydrogen in the insulator 581 is preferably reduced.

Furthermore, a conductor 540a and a conductor 540b are positioned in openings formed in the insulator 581, the insulator 574, the insulator 580, and the insulator 544. The conductor 540a and the conductor 540b are provided to face each other with the conductor 560 therebetween. The structures of the conductor 540a and the conductor 540b are similar to a structure of a conductor 546 and a conductor 548 that are described later.

An insulator 582 is provided over the insulator 581. A substance having a barrier property against oxygen or hydrogen is preferably used for the insulator 582. Therefore, a material similar to that for the insulator 514 can be used for the insulator 582. For the insulator 582, a metal oxide such as aluminum oxide, hafnium oxide, or tantalum oxide is preferably used, for example.

In particular, aluminum oxide has an excellent blocking effect that prevents the passage of both oxygen and impurities such as hydrogen and moisture which are factors of a change in electrical characteristics of the transistor. Accordingly, aluminum oxide can prevent mixing of impurities such as hydrogen and moisture into the transistor 500 in a manufacturing process and after manufacturing of the transistor. In addition, release of oxygen from the oxide included in the transistor 500 can be inhibited. Therefore, aluminum oxide is suitably used for a protective film of the transistor 500.

In addition, an insulator 586 is provided over the insulator 582. For the insulator 586, a material similar to that for the insulator 320 can be used. Furthermore, when a material with a comparatively low dielectric constant is used for these insulators, parasitic capacitance generated between wirings can be reduced. A silicon oxide film, a silicon oxynitride film, or the like can be used for the insulator 586, for example.

Furthermore, the conductor 546, the conductor 548, and the like are embedded in the insulator 520, the insulator 522, the insulator 524, the insulator 544, the insulator 580, the insulator 574, the insulator 581, the insulator 582, and the insulator 586.

The conductor 546 and the conductor 548 have functions of plugs or wirings that are connected to the capacitor 800, the transistor 500, or the transistor 300. The conductor 546 and the conductor 548 can be provided using materials similar to those for the conductor 328 and the conductor 330.

Next, the capacitor 800 is provided above the transistor 500. The capacitor 800 includes a conductor 810, a conductor 820, and an insulator 830.

In addition, a conductor 812 may be provided over the conductor 546 and the conductor 548. The conductor 812 has a function of a plug or a wiring that is connected to the transistor 500. The conductor 810 has a function of an electrode of the capacitor 800. The conductor 812 and the conductor 810 can be formed at the same time.

For the conductor 812 and the conductor 810, a metal film containing an element selected from molybdenum, titanium, tantalum, tungsten, aluminum, copper, chromium, neodymium, and scandium; a metal nitride film containing the above element as its component (a tantalum nitride film, a titanium nitride film, a molybdenum nitride film, or a tungsten nitride film); or the like can be used. Alternatively, it is possible to use a conductive material such as indium tin oxide, indium oxide containing tungsten oxide, indium zinc oxide containing tungsten oxide, indium oxide containing titanium oxide, indium tin oxide containing titanium oxide, indium zinc oxide, or indium tin oxide to which silicon oxide is added.

Although the conductor 812 and the conductor 810 each having a single-layer structure are shown in FIG. 11, the structure is not limited thereto; a stacked-layer structure of two or more layers may be employed. For example, between a conductor having a barrier property and a conductor having high conductivity, a conductor that is highly adhesive to the conductor having a barrier property and the conductor having high conductivity may be formed.

The conductor 820 is provided so as to overlap with the conductor 810 with the insulator 830 positioned therebetween. The conductor 820 can be formed using a conductive material such as a metal material, an alloy material, or a metal oxide material. It is preferable to use a high-melting-point material that has both heat resistance and conductivity, such as tungsten or molybdenum, and it is particularly preferable to use tungsten. In addition, in the case where the conductor is formed concurrently with another component such as a conductor, Cu (copper), Al (aluminum), or the like, which is a low-resistance metal material, is used.

An insulator 840 is provided over the conductor 820 and the insulator 830. The insulator 840 can be provided using a material similar to that for the insulator 320. The insulator 840 may function as a planarization film that covers an uneven shape thereunder.

With the use of this structure, a change in electrical characteristics can be inhibited and reliability can be improved in a semiconductor device using a transistor including an oxide semiconductor. Alternatively, a memory device, an arithmetic device, or the like using a transistor including an oxide semiconductor can be miniaturized or highly integrated.

[Metal Oxide]

A metal oxide that can be used for the semiconductor layer (the oxide 530) where the channel of the transistor is formed is described below.

Note that in this specification and the like, a metal oxide containing nitrogen is also collectively referred to as a metal oxide in some cases. A metal oxide containing nitrogen may be referred to as a metal oxynitride. For example, a metal oxide containing nitrogen, such as zinc oxynitride (ZnON), may be used for the semiconductor layer.

Note that in this specification and the like, "CAAC (c-axis aligned crystal)" or "CAC (Cloud-Aligned Composite)"

might be stated. Note that CAAC refers to an example of a crystal structure, and CAC refers to an example of a function or a material composition.

For example, a CAC (Cloud-Aligned Composite)-OS can be used for the semiconductor layer.

A CAC-OS or a CAC-metal oxide has a conducting function in part of the material and has an insulating function in another part of the material; as a whole, the CAC-OS or the CAC-metal oxide has a function of a semiconductor. In the case where the CAC-OS or the CAC-metal oxide is used in a semiconductor layer of a transistor, the conducting function is to allow electrons (or holes) serving as carriers to flow, and the insulating function is to not allow electrons serving as carriers to flow. By the complementary action of the conducting function and the insulating function, a switching function (On/Off function) can be given to the CAC-OS or the CAC-metal oxide. In the CAC-OS or the CAC-metal oxide, separation of the functions can maximize each function.

Furthermore, the CAC-OS or the CAC-metal oxide includes conductive regions and insulating regions. The conductive regions have the above-described conducting function, and the insulating regions have the above-described insulating function. Furthermore, in some cases, the conductive regions and the insulating regions in the material are separated at the nanoparticle level. Furthermore, in some cases, the conductive regions and the insulating regions are unevenly distributed in the material. Furthermore, in some cases, the conductive regions are observed to be coupled in a cloud-like manner with their boundaries blurred.

Furthermore, in the CAC-OS or the CAC-metal oxide, the conductive regions and the insulating regions each have a size greater than or equal to 0.5 nm and less than or equal to 10 nm, preferably greater than or equal to 0.5 nm and less than or equal to 3 nm, and are dispersed in the material, in some cases.

Furthermore, the CAC-OS or the CAC-metal oxide includes components having different bandgaps. For example, the CAC-OS or the CAC-metal oxide includes a component having a wide gap due to the insulating region and a component having a narrow gap due to the conductive region. In the case of the structure, when carriers flow, carriers mainly flow in the component having a narrow gap. Furthermore, the component having a narrow gap complements the component having a wide gap, and carriers also flow in the component having a wide gap in conjunction with the component having a narrow gap. Therefore, in the case where the above-described CAC-OS or CAC-metal oxide is used in a channel formation region of a transistor, high current driving capability in an on state of the transistor, that is, a high on-state current and high field-effect mobility can be obtained.

In other words, the CAC-OS or the CAC-metal oxide can also be referred to as a matrix composite or a metal matrix composite.

Oxide semiconductors (metal oxides) can be classified into a single crystal oxide semiconductor and a non-single-crystal oxide semiconductor. Examples of a non-single-crystal oxide semiconductor include a CAAC-OS (c-axis aligned crystalline oxide semiconductor), a polycrystalline oxide semiconductor, an nc-OS (nanocrystalline oxide semiconductor), an amorphous-like oxide semiconductor (a-like OS), and an amorphous oxide semiconductor.

The CAAC-OS has c-axis alignment, a plurality of nanocrystals are connected in the a-b plane direction, and its crystal structure has distortion. Note that the distortion refers to a portion where the direction of a lattice arrangement changes between a region with a regular lattice arrangement and another region with a regular lattice arrangement in a region where the plurality of nanocrystals are connected.

The nanocrystal is basically a hexagon but is not always a regular hexagon and is a non-regular hexagon in some cases. Furthermore, a pentagonal or heptagonal lattice arrangement, for example, is included in the distortion in some cases. Note that it is difficult to observe a clear crystal grain boundary (also referred to as grain boundary) even in the vicinity of distortion in the CAAC-OS. That is, formation of a crystal grain boundary is found to be inhibited by the distortion of a lattice arrangement. This is because the CAAC-OS can tolerate distortion owing to a low density of arrangement of oxygen atoms in the a-b plane direction, an interatomic bond length changed by substitution of a metal element, and the like.

Furthermore, the CAAC-OS tends to have a layered crystal structure (also referred to as a layered structure) in which a layer containing indium and oxygen (hereinafter, In layer) and a layer containing the element M, zinc, and oxygen (hereinafter, (M,Zn) layer) are stacked. Note that indium and the element M can be replaced with each other, and when the element M in the (M,Zn) layer is replaced with indium, the layer can also be referred to as an (In,M,Zn) layer. Furthermore, when indium in the In layer is replaced with the element M, the layer can be referred to as an (In,M) layer.

The CAAC-OS is a metal oxide with high crystallinity. On the other hand, a clear crystal grain boundary cannot be observed in the CAAC-OS; thus, it can be said that a reduction in electron mobility due to the crystal grain boundary is less likely to occur. Entry of impurities, formation of defects, or the like might decrease the crystallinity of a metal oxide; thus, it can be said that the CAAC-OS is a metal oxide that has small amounts of impurities and defects (e.g., oxygen vacancies (also referred to as Vo)). Thus, a metal oxide including a CAAC-OS is physically stable. Therefore, the metal oxide including a CAAC-OS is resistant to heat and has high reliability.

In the nc-OS, a microscopic region (e.g., a region with a size greater than or equal to 1 nm and less than or equal to 10 nm, in particular, a region with a size greater than or equal to 1 nm and less than or equal to 3 nm) has a periodic atomic arrangement. Furthermore, there is no regularity of crystal orientation between different nanocrystals in the nc-OS. Thus, the orientation in the whole film is not observed. Accordingly, the nc-OS cannot be distinguished from an a-like OS or an amorphous oxide semiconductor by some analysis methods.

Note that indium-gallium-zinc oxide (hereinafter referred to as IGZO) that is a kind of metal oxide containing indium, gallium, and zinc has a stable structure in some cases by being formed of the above-described nanocrystals. In particular, crystals of IGZO tend not to grow in the air and thus, a stable structure is obtained when IGZO is formed of smaller crystals (e.g., the above-described nanocrystals) rather than larger crystals (here, crystals with a size of several millimeters or several centimeters).

An a-like OS is a metal oxide having a structure between those of the nc-OS and an amorphous oxide semiconductor. The a-like OS includes a void or a low-density region. That is, the a-like OS has low crystallinity as compared with the nc-OS and the CAAC-OS.

An oxide semiconductor (metal oxide) can have various structures which show different properties. Two or more of the amorphous oxide semiconductor, the polycrystalline oxide semiconductor, the a-like OS, the nc-OS, and the CAAC-OS may be included in an oxide semiconductor of one embodiment of the present invention.

A metal oxide film that functions as a semiconductor layer can be formed using either or both of an inert gas and an oxygen gas. Note that there is no particular limitation on the flow rate ratio of oxygen (the partial pressure of oxygen) at the time of forming the metal oxide film. However, to obtain a transistor having high field-effect mobility, the flow rate ratio of oxygen (the partial pressure of oxygen) at the time of forming the metal oxide film is preferably higher than or equal to 0% and lower than or equal to 30%, further preferably higher than or equal to 5% and lower than or equal to 30%, still further preferably higher than or equal to 7% and lower than or equal to 15%. In contrast, to obtain a high-crystallinity metal oxide film, the flow rate ratio of oxygen (the partial pressure of oxygen) is preferably high; for example, the flow rate ratio of oxygen (the partial pressure of oxygen) is preferably within the range of 30% to 100%, further preferably within the range of 50% to 100%, and still further preferably within the range of 60% to 100%.

The energy gap of the metal oxide is preferably 2 eV or more, further preferably 2.5 eV or more, still further preferably 3 eV or more. With the use of a metal oxide having such a wide energy gap, the off-state current of the transistor can be reduced.

The substrate temperature during the formation of the metal oxide film is preferably lower than or equal to 350° C., further preferably higher than or equal to room temperature and lower than or equal to 200° C., still further preferably higher than or equal to room temperature and lower than or equal to 130° C. The substrate temperature at the time of depositing the metal oxide film is preferably room temperature because productivity can be increased. In contrast, the higher the temperature at the time of deposition is, the higher the crystallinity becomes.

The metal oxide film can be formed by a sputtering method. Alternatively, for example, a PLD method, a PECVD method, a thermal CVD method, an ALD method, or a vacuum evaporation method may be used.

Furthermore, a metal oxide with a low carrier concentration is preferably used as the transistor. In order to reduce the carrier concentration of the metal oxide, the concentration of impurities in the metal oxide is reduced so that the density of defect states can be reduced. In this specification and the like, a state with a low impurity concentration and a low density of defect states is referred to as a highly purified intrinsic or substantially highly purified intrinsic state. As examples of the impurities in the metal oxide, hydrogen, nitrogen, alkali metal, alkaline earth metal, iron, nickel, silicon, and the like are given.

In particular, hydrogen contained in a metal oxide reacts with oxygen bonded to a metal atom to be water, and thus forms oxygen vacancies in the metal oxide in some cases. If the channel formation region in the metal oxide includes oxygen vacancies, the transistor sometimes has normally-on characteristics in some cases. In some cases, a defect that is an oxygen vacancy into which hydrogen enters functions as a donor and generates an electron serving as a carrier. In other cases, bonding of part of hydrogen to oxygen bonded to a metal atom generates electrons serving as carriers. Thus, a transistor using a metal oxide containing much hydrogen is likely to have normally-on characteristics.

A defect in which hydrogen has entered an oxygen vacancy can function as a donor of the metal oxide. However, it is difficult to evaluate the defects quantitatively. Thus, the metal oxide is sometimes evaluated by not its donor concentration but its carrier concentration. Therefore, in this specification and the like, the carrier concentration assuming the state where an electric field is not applied is sometimes used, instead of the donor concentration, as the parameter of the metal oxide. That is, "carrier concentration" in this specification and the like can be replaced with "donor concentration" in some cases.

Therefore, hydrogen in the metal oxide is preferably reduced as much as possible. Specifically, the hydrogen concentration of the metal oxide, which is measured by secondary ion mass spectrometry (SIMS), is lower than $1\times10^{20}$ atoms/cm$^3$, preferably lower than $1\times10^{19}$ atoms/cm$^3$, further preferably lower than $5\times10^{18}$ atoms/cm$^3$, still further preferably lower than $1\times10^{18}$ atoms/cm$^3$. When a metal oxide with a sufficiently low concentration of impurities such as hydrogen is used for a channel formation region of a transistor, the transistor can have stable electrical characteristics.

The carrier concentration of the channel formation region of the metal oxide is preferably lower than or equal to $1\times10^{18}$ cm$^{-3}$, further preferably lower than $1\times10^{17}$ cm$^{-3}$, still further preferably lower than $1\times10^{16}$ cm$^{-3}$, yet further preferably lower than $1\times10^{13}$ cm$^{-3}$, yet still further preferably lower than $1\times10^{12}$ cm$^{-3}$. Note that the lower limit of the carrier concentration of the channel formation region of the metal oxide is not particularly limited and can be, for example, $1\times10^{-9}$ cm$^3$.

At least part of this embodiment can be implemented in combination with the other embodiments described in this specification as appropriate.

REFERENCE NUMERALS 10, 10a-d: testing device, 11: control unit, 12: timing-circuit unit, 13, 13a, 13b: sending unit, 14, 14a, 14b: receiving unit, 15: display, 15a, 15b: selection circuit, 21: memory portion, 21D: memory portion, 22: arithmetic portion, 31, 31a, 31b: pulse-signal-generation portion, 32, 32a, 32b, 35, 35a, 35b: amplifier portion, 36: A/D converter portion, 40: probe, 41, 41a, 41b: piezoelectric element, 51: ultrasonic wave, 52: reflected wave, 61: pixel portion, 62: source driver circuit, 63: gate driver circuit, 64: timing circuit, 71: sequential circuit, 72: level shift circuit, 75: pixel, 80: specimen, 81: flaw, 100a, 100b: testing device, 101: housing, 102: display, 103: operation button, 104: protective member, 105: support member, 107: connector cable, 110a, 110b, 110c: probe, 111, 111a, 111b: oscillator, 112: case, 113: contact portion, 114: terminal portion, 115: wiring, 116: damper, 117: transmitting member, 118: noise-absorbing member, 119: sound-separating member, 121: sound-delaying member

The invention claimed is:

1. A testing device comprising a sending unit, a receiving unit, a control unit, a timing circuit, and a display,
   wherein the control unit comprises a memory portion and an arithmetic portion,
   wherein the sending unit is configured to output a pulse signal for a probe to generate an ultrasonic wave,
   wherein the receiving unit is configured to generate a first signal including a first analog data on the basis of an input signal input from the probe and outputting it to the control unit,
   wherein the memory portion is configured to store the first analog data,
   wherein the arithmetic portion is configured to generate an image signal output to the display on the basis of the first analog data stored in the memory portion, and wherein the timing circuit is configured to generate a first timing signal and a second timing signal in response to an instruction from the control unit, wherein the sending unit is configured to output the pulse signal on the basis of the first timing signal, and wherein the receiving unit is configured to sample the signal input from the probe on the basis of the second timing signal and generating the first signal comprising the first analog data, wherein the display is configured to display an image based on the image signal.

2. The testing device according to claim 1, wherein the receiving unit comprises an amplifier portion, and wherein the amplifier portion is configured to amplify a potential of the input signal and to generate a potential of the first analog data.

3. The testing device according to claim 2, wherein the testing device comprises a timing circuit, wherein the timing circuit generates a first timing signal and a second timing signal in response to an instruction from the control unit, wherein the sending unit is configured to output the pulse signal on the basis of the first timing signal, and wherein the receiving unit is configured to sample the signal input from the probe and to generate the first signal comprising the first analog data.

4. The testing device according to claim 2, wherein the display comprises a plurality of pixels, wherein the image signal output by the control unit comprises a second analog data associated with coordinates of the pixels, and wherein a potential of the second analog data is equal to a potential of the first analog data.

5. The testing device according to claim 1, wherein the testing device comprises a first signal selection portion, wherein the testing device comprises a plurality of the sending units, and wherein the first signal selection portion is configured to select, among a plurality of the pulse signals input from the plurality of the sending units, the pulse signal output to the probe.

6. The testing device according to claim 5, wherein the display comprises a plurality of pixels, wherein the image signal output by the control unit comprises a second analog data associated with coordinates of the pixels, and wherein a potential of the second analog data is equal to a potential of the first analog data.

7. The testing device according to claim 1, wherein the testing device comprises a second signal selection portion, and wherein the second signal selection portion is configured to select, among a plurality of the input signals input from the probe, the input signal input to the receiving unit.

8. The testing device according to claim 7, wherein the display comprises a plurality of pixels, wherein the image signal output by the control unit comprises a second analog data associated with coordinates of the pixels, and wherein a potential of the second analog data is equal to a potential of the first analog data.

9. The testing device according to claim 1, wherein the display comprises a plurality of pixels, wherein the image signal output by the control unit comprises a second analog data associated with coordinates of the pixels, and wherein a potential of the second analog data is equal to a potential of the first analog data.

10. The testing device according to claim 9, wherein the display comprises a level shift circuit, and wherein the level shift circuit is configured to shift a level of the potential of the second analog data and to generate a potential input to the pixel.

11. The testing device according to claim 10, wherein the display is configured to display a two-dimensional mapping image on the basis of the second analog data.

12. The testing device according to claim 10, wherein the memory portion comprises a memory cell, and wherein the memory cell comprises a first transistor comprising an oxide semiconductor.

13. The testing device according to claim 9, wherein the display is configured to display a two-dimensional mapping image on the basis of the second analog data.

14. The testing device according to claim 13, wherein the memory portion comprises a memory cell, and wherein the memory cell comprises a first transistor comprising an oxide semiconductor.

15. The testing device according to claim 9, wherein the memory portion comprises a memory cell, and wherein the memory cell comprises a first transistor comprising an oxide semiconductor.

16. The testing device according to claim 9, wherein the arithmetic portion comprises an arithmetic circuit which executes analog arithmetic processing, and wherein the arithmetic circuit comprises a second transistor comprising an oxide semiconductor.

17. The testing device according to claim 1, wherein the memory portion comprises a memory cell, and wherein the memory cell comprises a first transistor comprising an oxide semiconductor.

18. The testing device according to claim 1, wherein the arithmetic portion comprises an arithmetic circuit which executes analog arithmetic processing, and wherein the arithmetic circuit comprises a second transistor comprising an oxide semiconductor.

* * * * *